United States Patent [19]
Scott et al.

[11] Patent Number: 6,041,046
[45] Date of Patent: Mar. 21, 2000

[54] CYCLIC TIME HOPPING IN TIME DIVISION MULTIPLE ACCESS COMMUNICATION SYSTEM

[75] Inventors: Logan Scott, Breckenridge; Claude M. Williams, Colorado Springs, both of Colo.

[73] Assignee: Omnipoint Corporation, Colorado Springs, Colo.

[21] Appl. No.: 08/502,514

[22] Filed: Jul. 14, 1995

[51] Int. Cl.$^7$ ...................................................... H04J 3/16
[52] U.S. Cl. .......................... 370/319; 370/347; 370/458; 375/138
[58] Field of Search .................... 370/95.3, 95.2, 370/93, 18, 19, 458, 331, 320, 321, 335, 342, 441, 479, 319, 347, 348; 375/200, 202, 203, 130, 132, 138; 455/33.1; 379/58

[56] References Cited

U.S. PATENT DOCUMENTS

| | | | |
|---|---|---|---|
| Re. 27,738 | 8/1973 | Honma et al. | 332/9 R |
| Re. 35,402 | 12/1996 | Schilling | 375/203 |
| 3,934,203 | 1/1976 | Schiff | 325/65 |
| 4,189,677 | 2/1980 | Cooper et al. | 325/321 |
| 4,222,115 | 9/1980 | Cooper et al. | 375/1 |
| 4,301,530 | 11/1981 | Gutleber | 370/1 |
| 4,320,514 | 3/1982 | Haskell | 375/1 |
| 4,418,425 | 11/1983 | Fennel et al. | 455/27 |
| 4,425,642 | 1/1984 | Moses et al. | 370/76 |
| 4,425,661 | 1/1984 | Moses et al. | 375/1 |
| 4,432,089 | 2/1984 | Wurzburg et al. | 370/110.1 |

(List continued on next page.)

FOREIGN PATENT DOCUMENTS

| | | | |
|---|---|---|---|
| 0 189 695 | 6/1986 | European Pat. Off. | H04B 7/26 |
| 93/15573 | 8/1993 | WIPO | H04J 13/00 |
| 9318601 | 9/1993 | WIPO | H04L 27/30 |
| 94/06217 | 3/1994 | WIPO | H04B 7/005 |
| 9512938 | 5/1995 | WIPO | H04J 13/00 |

OTHER PUBLICATIONS

Collins, J.H. et al., The Role of Surface Acoustic Wave Technology in Communication Systems, Ultrasonics, 10(2):59–71, Mar. 1972.

Ruprecht, Jurg, Code Time Division Multiple Access: A Method for the Orthogonalization of CDMA Signals in Multipath Environment, Aachener Kolloquium "Signal theorie", "Mobile Kommunikation Systems", Mar. 1994, pp. 1–8.

Saleh, Adel A.M. et al., An Experimental TDMA Indoor Radio Communications System Using Slow Frequency Hopping and Coding, IEEE Transactions on Communications, 39(1):152–161, Jan. 1991.

Dixon, Robert C., Spread Spectrum Systems with Commercial Applications (J. Wiley & Sons, 3d ed. 1994).

(List continued on next page.)

*Primary Examiner*—Douglas W. Olms
*Assistant Examiner*—Shick Hom
*Attorney, Agent, or Firm*—Lyon & Lyon LLP

[57] ABSTRACT

A technique for cyclic time hopping in a multiple access communication system, wherein each time frame of a TDMA system is divided into multiple time slots. A plurality of user stations, one for each time slot, communicate with a base station. Each user station regularly varies its relative time slot position in a pseudo-random pattern. Orthogonal time hopping patterns are determined from a root pattern according to a predetermined equation or relationship. The effect of transmitting bursts in a pseudo-random pattern is to break up the otherwise strict periodicity of TDMA bursts, and to produce a more noiselike spectrum for switching transients, thereby reducing the level of interfering spectral components from a TDMA transmission source. In some embodiments, the time hopping pattern may be restricted to only odd or even time slots. In such embodiments, a dead time slot may be declared periodically so as to increase the apparent randomness of the user station transmission patterns. In a preferred embodiment, spread spectrum communication is employed for base station and user station transmissions.

17 Claims, 27 Drawing Sheets

| | TF1 | TF2 | TF3 | TF4 | TF5 | TF6 | TF7 | TF8 |
|---|---|---|---|---|---|---|---|---|
| TS4 | D | B | A | C | C | D | B | A |
| TS3 | C | A | D | B | B | C | A | D |
| TS2 | B | D | C | A | A | B | D | C |
| TS1 | A | C | B | D | D | A | C | B |

Time Slot Number 602
Frame Number 601

U.S. PATENT DOCUMENTS

| | | | |
|---|---|---|---|
| 4,484,028 | 11/1984 | Kelley et al. | 179/2 DP |
| 4,525,835 | 7/1985 | Vance et al. | 370/29 |
| 4,554,668 | 11/1985 | Deman et al. | 375/1 |
| 4,561,089 | 12/1985 | Rouse et al. | 370/18 |
| 4,567,588 | 1/1986 | Jerrim | 370/18 |
| 4,587,662 | 5/1986 | Langewellpott | 375/1 |
| 4,601,047 | 7/1986 | Horwitz et al. | 375/2.2 |
| 4,612,637 | 9/1986 | Davis et al. | 370/95 |
| 4,653,069 | 3/1987 | Roeder | 380/31 |
| 4,675,863 | 6/1987 | Paneth et al. | 370/50 |
| 4,688,210 | 8/1987 | Eizenhöfer et al. | 370/18 |
| 4,707,839 | 11/1987 | Andren et al. | 375/1 |
| 4,724,435 | 2/1988 | Moses et al. | 340/870.13 |
| 4,736,371 | 4/1988 | Tejima et al. | 370/95 |
| 4,742,512 | 5/1988 | Akashi et al. | 370/96 |
| 4,754,453 | 6/1988 | Eizenhofer | 370/95 |
| 4,765,753 | 8/1988 | Schmidt | 379/60 |
| 4,769,812 | 9/1988 | Shimizu | 370/67 |
| 4,787,093 | 11/1988 | Rorden | 375/23 |
| 4,797,947 | 1/1989 | Labedz | 455/33 |
| 4,807,222 | 2/1989 | Amitay | 370/85 |
| 4,809,268 | 2/1989 | Tejima et al. | 370/95.2 |
| 4,837,786 | 6/1989 | Gurantz et al. | 370/20 |
| 4,918,689 | 4/1990 | Hui | 370/85.9 |
| 4,928,274 | 5/1990 | Gilhousen et al. | 370/92 |
| 4,979,170 | 12/1990 | Gilhousen et al. | 370/104.1 |
| 5,008,953 | 4/1991 | Dahlin et al. | 455/33 |
| 5,016,255 | 5/1991 | Dixon et al. | 375/1 |
| 5,020,056 | 5/1991 | Chennakeshu | 370/95.3 |
| 5,022,024 | 6/1991 | Paneth et al. | 375/50 |
| 5,022,047 | 6/1991 | Dixon et al. | 375/1 |
| 5,029,184 | 7/1991 | Andren et al. | 375/1 |
| 5,042,050 | 8/1991 | Owen | 375/1 |
| 5,042,082 | 8/1991 | Dahlin | 455/33 |
| 5,097,484 | 3/1992 | Akaiwa | 375/40 |
| 5,103,459 | 4/1992 | Gilhousen et al. | 375/1 |
| 5,111,535 | 5/1992 | Tokunaga | 455/33.2 |
| 5,166,929 | 11/1992 | Lo | 370/85.3 |
| 5,170,412 | 12/1992 | Massey | 375/1 |
| 5,177,765 | 1/1993 | Holland et al. | 375/1 |
| 5,177,766 | 1/1993 | Holland et al. | 375/1 |
| 5,193,101 | 3/1993 | McDonald et al. | 375/1 |
| 5,195,090 | 3/1993 | Bolliger et al. | 370/94.1 |
| 5,195,091 | 3/1993 | Farwell et al. | 370/94.1 |
| 5,200,956 | 4/1993 | Pudney et al. | 370/95.1 |
| 5,210,771 | 5/1993 | Schaeffer et al. | 375/1 |
| 5,218,618 | 6/1993 | Sagey | 375/1 |
| 5,239,572 | 8/1993 | Saegusa et al. | 379/61 |
| 5,263,047 | 11/1993 | Kotzin et al. | 375/1 |
| 5,267,261 | 11/1993 | Blakeney et al. | 375/1 |
| 5,278,835 | 1/1994 | Ito et al. | 370/95.3 |
| 5,289,497 | 2/1994 | Jacobson et al. | 375/1 |
| 5,291,475 | 3/1994 | Bruckert | 370/95.3 |
| 5,291,516 | 3/1994 | Dixon et al. | 375/1 |
| 5,299,198 | 3/1994 | Kay et al. | 370/95.3 |
| 5,313,457 | 5/1994 | Hostetter et al. | 370/18 |
| 5,341,396 | 8/1994 | Higgins et al. | 375/1 |
| 5,353,303 | 10/1994 | Walthall | 375/1 |
| 5,377,192 | 12/1994 | Goodings et al. | 370/95.3 |
| 5,383,219 | 1/1995 | Wheatley et al. | 375/1 |
| 5,392,287 | 2/1995 | Tiedemann et al. | 370/95.1 |
| 5,410,568 | 4/1995 | Schilling | 375/205 |
| 5,414,796 | 5/1995 | Jacobs et al. | 395/2.3 |
| 5,416,797 | 5/1995 | Gilhousen et al. | 375/705 |
| 5,420,851 | 5/1995 | Seshadri et al. | 370/29 |
| 5,422,930 | 6/1995 | McDonald et al. | 379/58 |
| 5,430,760 | 7/1995 | Dent | 375/200 |
| 5,444,696 | 8/1995 | Petranovich | 370/17 |
| 5,446,727 | 8/1995 | Bruckert et al. | 370/18 |
| 5,455,822 | 10/1995 | Dixon et al. | 370/18 |
| 5,469,468 | 11/1995 | Schilling | 375/200 |
| 5,481,533 | 1/1996 | Honig et al. | 370/95.3 |
| 5,506,863 | 4/1996 | Meidan et al. | 375/202 |
| 5,509,015 | 4/1996 | Tiedemann, Jr. et al. | 370/95.3 |
| 5,515,366 | 5/1996 | Chien et al. | 370/95.3 |
| 5,638,371 | 6/1997 | Raychaudhuri et al. | 370/347 |
| 5,729,541 | 3/1998 | Hamalainen et al. | 370/348 |

OTHER PUBLICATIONS

Shaft, Paul D., Low–Rate Convolutional Code Applications in Spread–Spectrum Communications, IEEE Transactions on Communications, Com–25(8):815–821, Aug. 1977.

Radio Sub–system Synchronization, GSM Recommendation 05.10 (Version 3.5.1), Released by ETSI/PT Oct. 1992.

Radio Equipment and Systems Digital European Cordless Telecommunications (DECT) Reference document, ETR 015, Mar. 1991.

Mohanty, Nirode C., Spread Spectrum and Time Division Multiple Access Satellite Communications, IEEE Transactions on Communications, Com–25(8):810–815, Aug. 1977.

In the Matter of: Omnipoint Corporation Amendment of the Commission's Rules to Establish New Personal Communications Services (FCC General Docket 90–314)—Opposition to Motion to Strike Dated: Sep. 29, 1993.

In the Matter of: Request of Omnipoint Communications, Inc. For a Pioneeer's Preference in the Licensing Process for Personal Communications Services (FCC General Docket 90–314)—Request for a Pioneer's Preference Dated: May 4, 1992.

In the Matter of: Omnipoint Corporation, Oracle Data Publishing, Inc., and McCaw Cellular Communicaitons, Inc.— Request for a Pioneer's Preference Dated: May 4, 1992.

Joint Technical Committee on Wireless Access (JTC) Omnipoint Candidate Air Interface Solution Dated: Nov. 1, 1993.

Joint Technical Committee on Wireless Access—JTC(Air) Standards Contribution (Air Interface Standards Project) Dated: Mar. 21, 1994.

Robert C. Dixon, "Spread Spectrum Systems with Commercial Applications" 3rd ed. (New York: John Wiley & Sons, Inc, 1994), 46–47, 420–425.

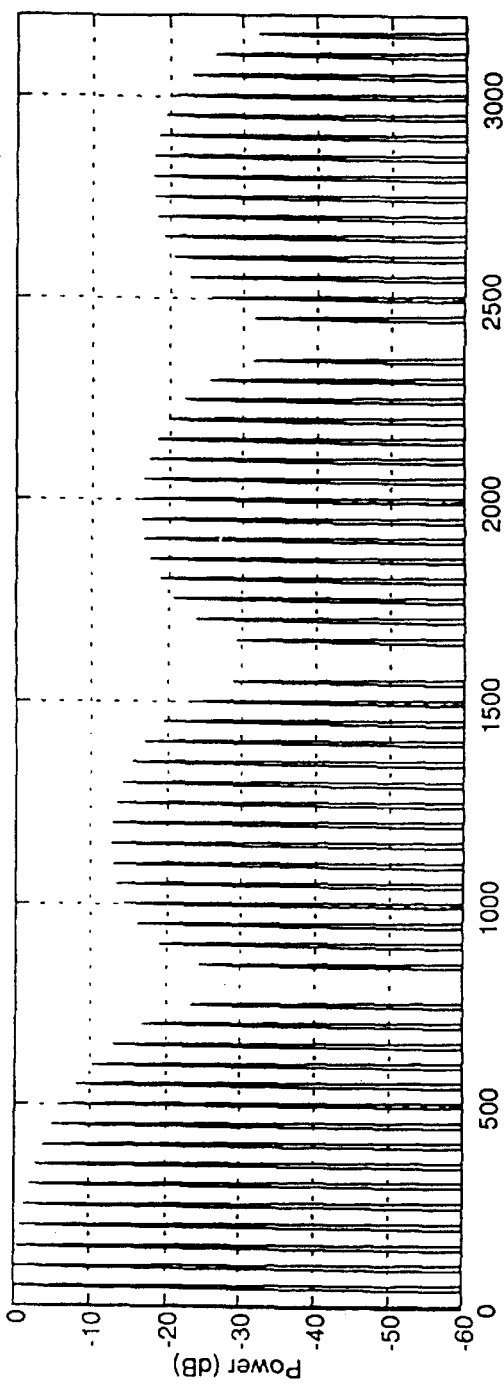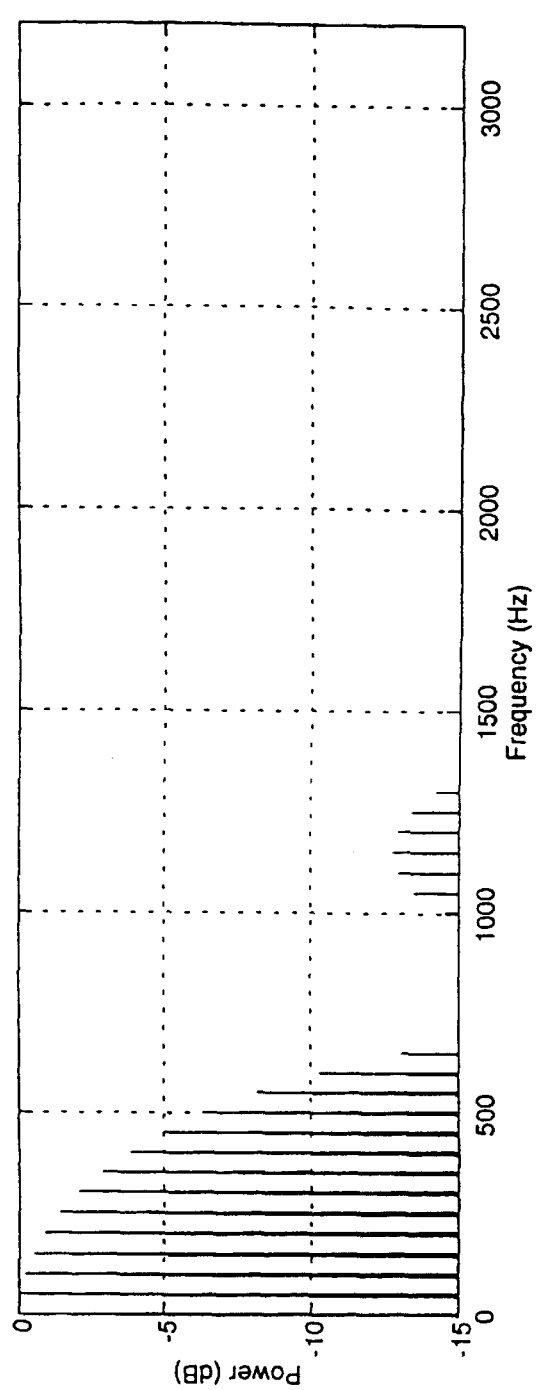
FIG. 5A.
FIG. 5B.

|     | TF1 | TF2 | TF3 | TF4 | TF5 | TF6 | TF7 | TF8 |
| --- | --- | --- | --- | --- | --- | --- | --- | --- |
| TS4 | D | B | A | C | C | D | B | A |
| TS3 | C | A | D | B | B | C | A | D |
| TS2 | B | D | C | A | A | B | D | C |
| TS1 | A | C | B | D | D | A | C | B |

Time Slot Number 602 (vertical axis)
Frame Number 601 (horizontal axis)

*FIG. 6.*

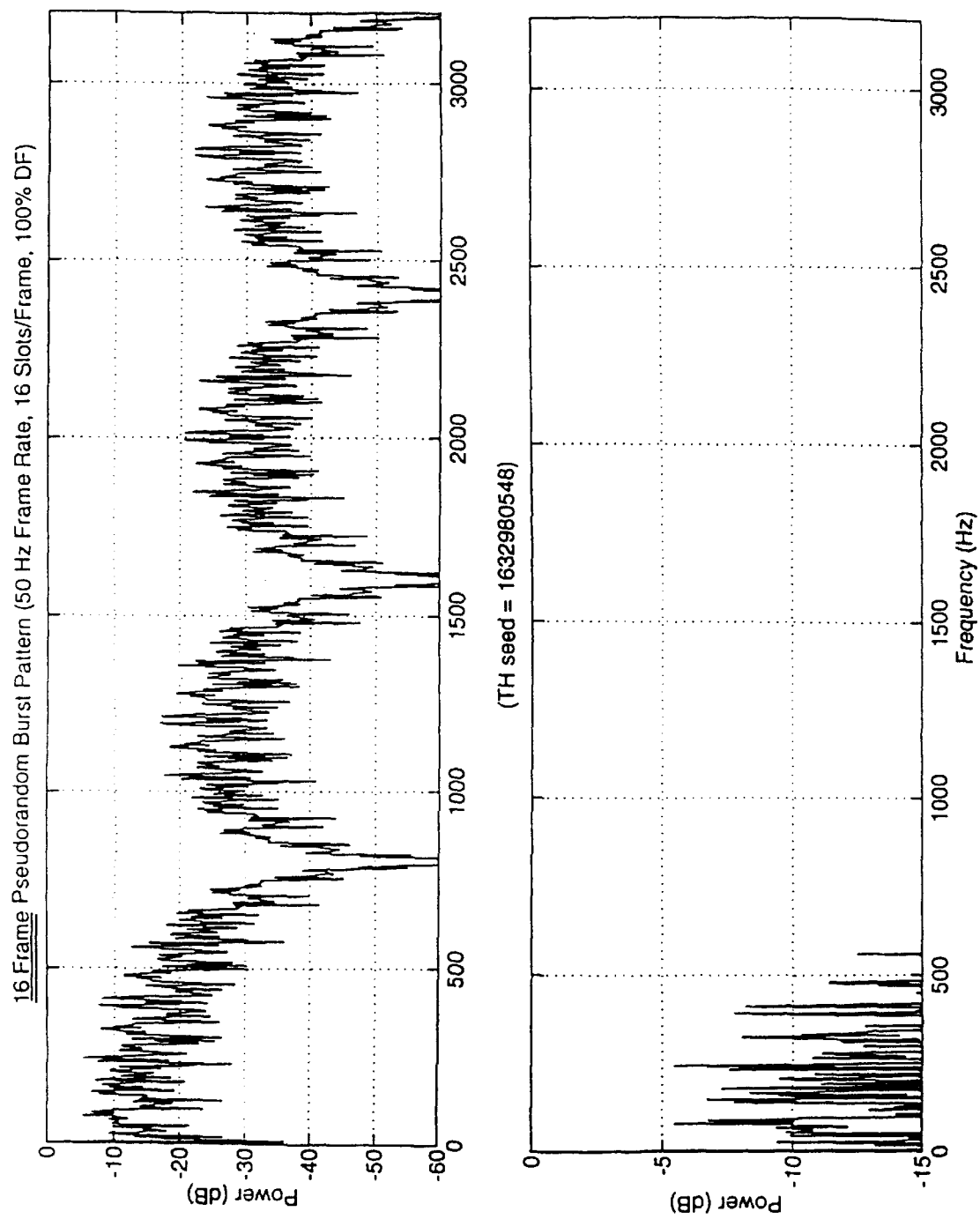

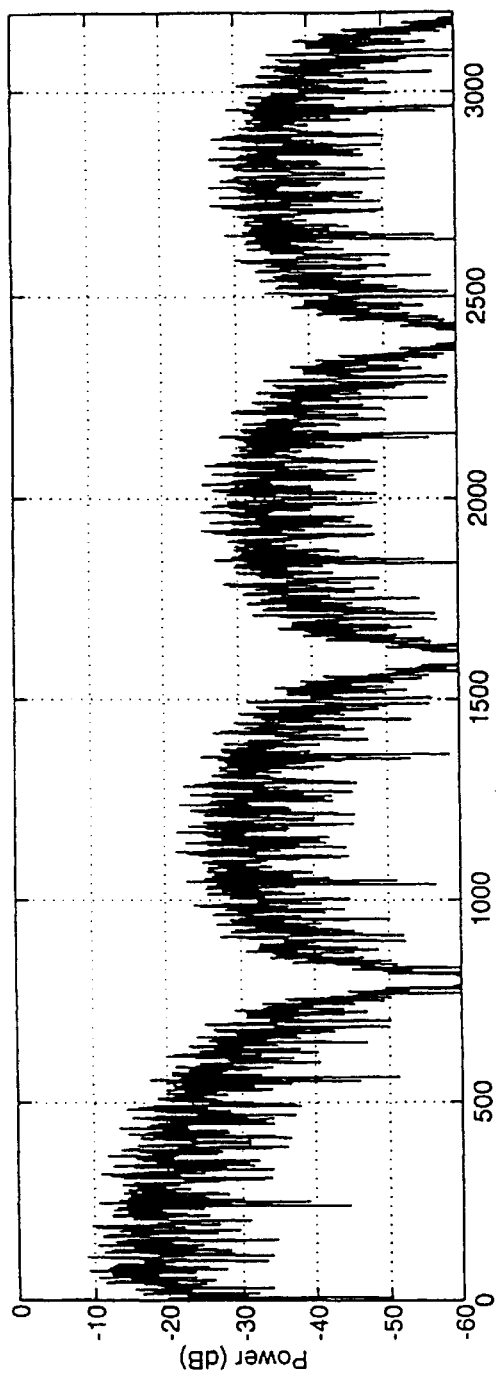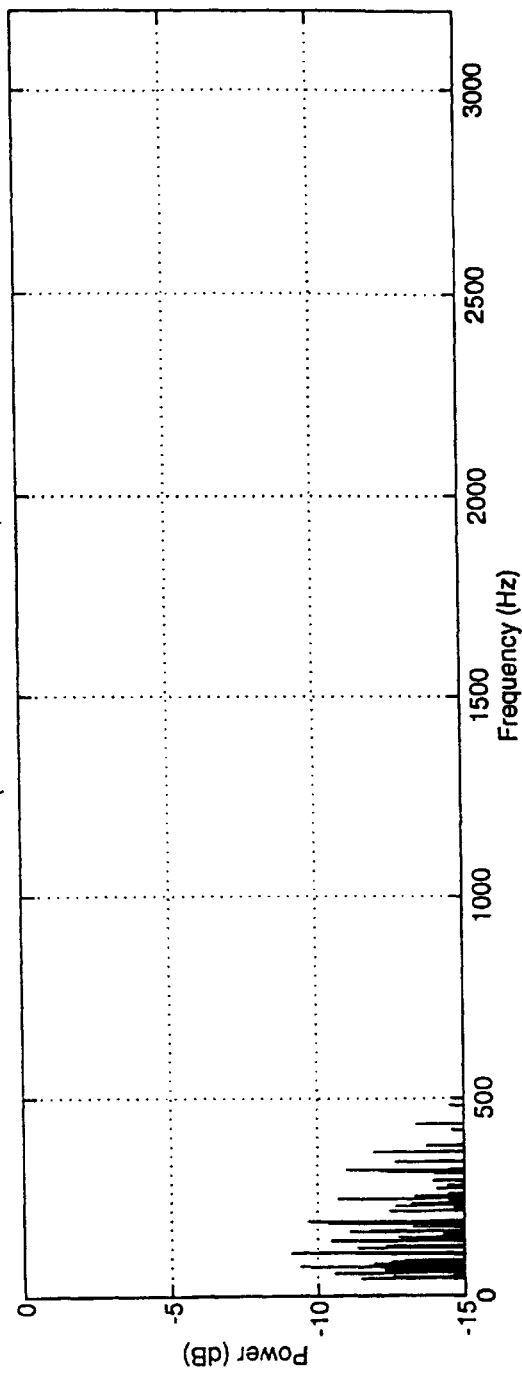
FIG. 13A.
FIG. 13B.

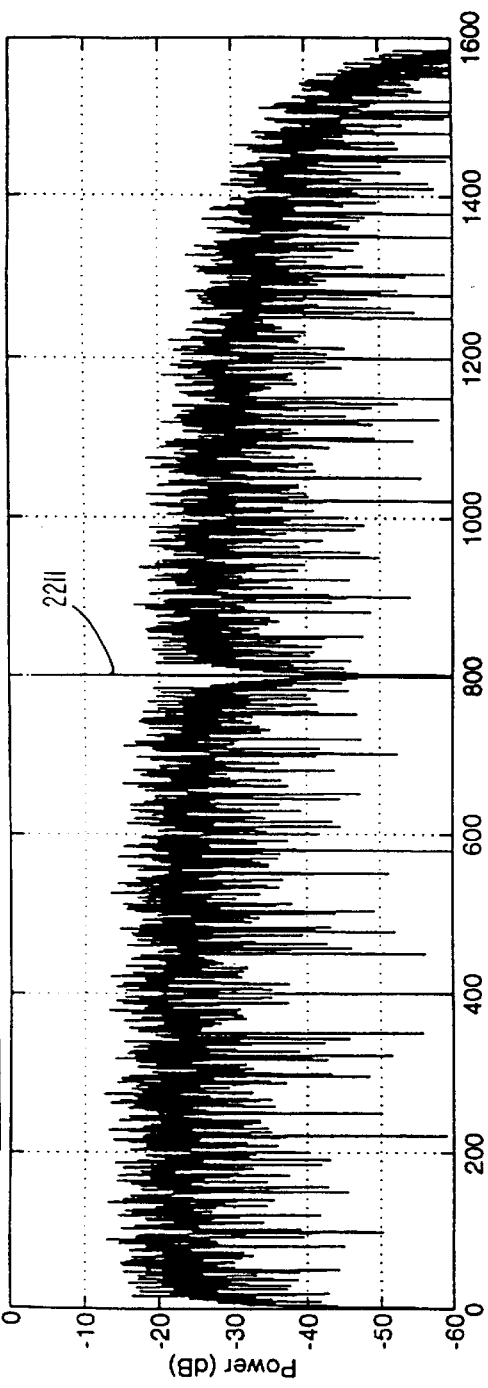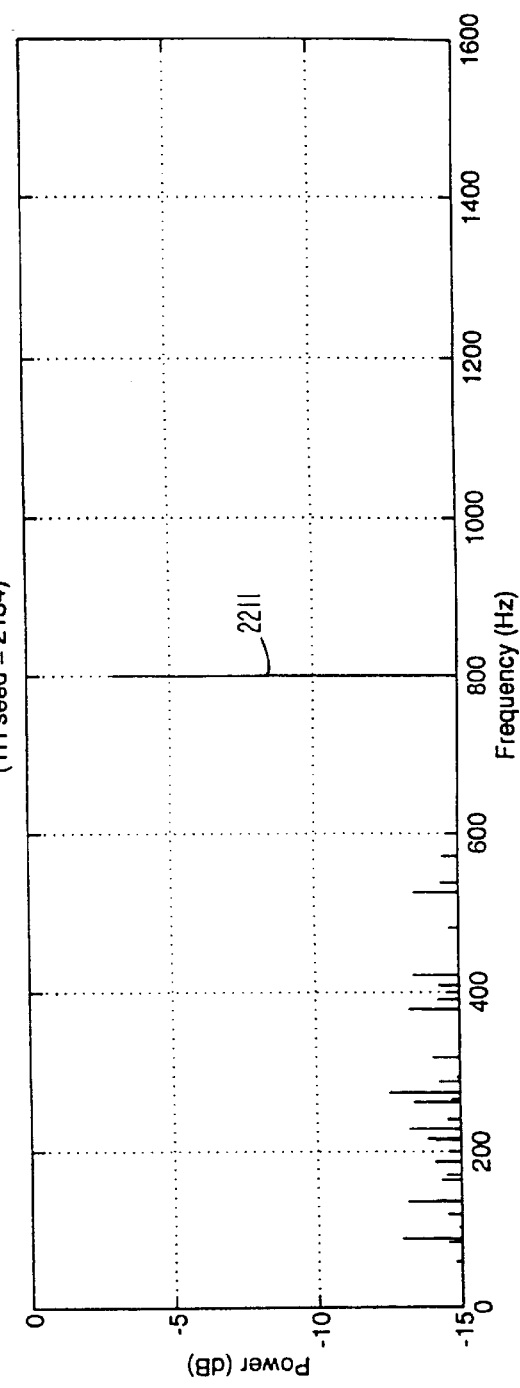
FIG. 22A.
FIG. 22B.

16 Frame Time Hop Sequence for 16 Slots (TH seed = 1632980548)

| mod(Frame_number,16)+1 | Root TH Pattern (Time Slot Number) |
|---|---|
| 1 | 6 |
| 2 | 15 |
| 3 | 9 |
| 4 | 12 |
| 5 | 16 |
| 6 | 10 |
| 7 | 4 |
| 8 | 11 |
| 9 | 7 |
| 10 | 8 |
| 11 | 2 |
| 12 | 13 |
| 13 | 1 |
| 14 | 3 |
| 15 | 14 |
| 16 | 5 |

FIG. 23.

80 Frame Time Hop Sequence for 16 Slots (Th seed = 500404249)

| Frame | Slot | Frame | Slot | Frame | Slot | Frame | Slot | Frame | Slot |
|---|---|---|---|---|---|---|---|---|---|
| 1 | 1 | 17 | 13 | 33 | 7 | 49 | 8 | 65 | 5 |
| 2 | 14 | 18 | 6 | 34 | 13 | 50 | 15 | 66 | 14 |
| 3 | 2 | 19 | 10 | 35 | 12 | 51 | 9 | 67 | 9 |
| 4 | 16 | 20 | 8 | 36 | 8 | 52 | 2 | 68 | 10 |
| 5 | 9 | 21 | 11 | 37 | 14 | 53 | 12 | 69 | 2 |
| 6 | 6 | 22 | 3 | 38 | 16 | 54 | 6 | 70 | 3 |
| 7 | 12 | 23 | 7 | 39 | 10 | 55 | 16 | 71 | 16 |
| 8 | 11 | 24 | 4 | 40 | 9 | 56 | 1 | 72 | 15 |
| 9 | 4 | 25 | 1 | 41 | 11 | 57 | 11 | 73 | 8 |
| 10 | 5 | 26 | 15 | 42 | 4 | 58 | 7 | 74 | 4 |
| 11 | 7 | 27 | 9 | 43 | 3 | 59 | 10 | 75 | 11 |
| 12 | 3 | 28 | 5 | 44 | 15 | 60 | 13 | 76 | 6 |
| 13 | 13 | 29 | 16 | 45 | 1 | 61 | 4 | 77 | 12 |
| 14 | 15 | 30 | 14 | 46 | 6 | 62 | 14 | 78 | 7 |
| 15 | 8 | 31 | 2 | 47 | 2 | 63 | 3 | 79 | 13 |
| 16 | 10 | 32 | 12 | 48 | 5 | 64 | 5 | 80 | 1 |

FIG. 24.

CYCLIC TIME HOPPING IN TIME DIVISION MULTIPLE ACCESS COMMUNICATION SYSTEM

BACKGROUND OF THE INVENTION

1. Field of the Invention

The field of the present invention relates to communications and, more particularly, to a technique for cyclic time hopping in a time division multiple access communication system.

2. Description of the Related Art

A mobile telephone system may generally comprise a set of "user stations", typically mobile and the endpoints of a communication path, and a set of "base stations", typically stationary and the intermediaries by which a communication path may be established or maintained.

One method of communicating with multiple user stations is time division multiple access (TDMA), wherein a time frame is divided into a plurality of smaller time units, or time slots, and communications from the base station and from the user stations are separated in time so as to avoid collisions. Transmissions may also be distinguished by using different assigned frequencies, thereby performing frequency division multiple access (FDMA), or by using different assigned codes, thereby performing code division multiple access (CDMA).

In a typical TDMA system, a user station is assigned a time slot for communicating with a base station. A single base station thereby communicates with multiple user stations, one in each time slot. The communication may be duplex where, for example, a forward link transmission and a reverse link transmission occur within a given time slot. Or, a forward link transmission may occur in an assigned time slot of a first time frame, and a reverse link transmission in the same relative time slot of a subsequent time frame.

A problem that has arisen in some TDMA systems is that the regular, periodic burst pattern of time division signals, particularly those associated with user stations, can cause undesirable side effects. In particular, the frequency at which the TDMA bursts occur from a particular source may lead to unwanted spectral components. Consequently, the TDMA transmissions can interfere with sensitive electronic equipment, and can, for example, couple into hearing aids to produce audible results, or may interfere with the operation of heart pacemakers. According to one exemplary study, as many as 16% of hearing aids experience interference when located near a handset of a GSM system (a type of TDMA system), and as many of 84% of hearing aids experience interference when placed directly next to a GSM handset. These types of undesired side effects may hinder deployment of a TDMA system where interference with sensitive electronic equipment is anticipated.

Further, radiation emissions from transmitters may be limited by government regulations or other similar restrictions. For example, regulations and standards may be promulgated by the American National Standards Institute (ANSI). One example is the ANSI C95.1 standard, which defines the allowable specific absorption rate (SAR) for periodic low frequency pulsed transmissions such as may be emitted, e.g., by cellular telephones. To increase the likelihood that TDMA and similar systems will be able to comply with governmental and other regulations, it is generally desirable to reduce potential interference from transmission sources as much as possible, without substantially impacting system performance.

Accordingly, it would be advantageous to provide a TDMA communication system that minimizes interference caused by low frequency pulsed transmissions arising from a periodic burst pattern, particularly with respect to sensitive electronic equipment such as hearing aids and pacemakers. It would further by advantageous to have such a system that minimizes or reduces radiation emissions for transmitters governed by various promulgated standards, including, for example, the ANSI C95.1 standard governing low frequency pulsed transmissions.

SUMMARY OF THE INVENTION

The present invention in one aspect generally provides a technique for cyclic time hopping in a multiple access communication system. In one embodiment, each time frame of a TDMA system is divided into multiple time slots. A plurality of user stations, one for each time slot, communicate with a base station. Each user station regularly varies its relative time slot position in a pseudo-random pattern.

The effect of transmitting bursts in a pseudo-random pattern is to break up the otherwise strict periodicity of TDMA bursts, and to produce a more noiselike spectrum for switching transients, thereby reducing the level of interfering spectral components from a TDMA transmission source.

Preferably, orthogonal time hopping patterns are selected for the user stations in communication with a base station. In one aspect of the invention, orthogonal time hopping patterns for user stations are constructed from the root pattern by application of the following formula:

$$P_i = \mathrm{mod}(P_0 + i - 2, n_{slots}) + 1$$

where $i = 1 \ldots n_{slots}$ is the number of time slots in the system; "mod" represents a modulus operation; and $P_0$ is the root time hopping pattern.

In a particular embodiment, all the base stations of a communication system in a geographic region employ the same time hopping pattern. The time hopping pattern is programmed in advance in each of the user stations. A user station establishing communication with any of the base stations in the system therefore knows in advance of the time hopping pattern, and each of the user stations follows the same time hopping pattern. The time hopping pattern may apply to handshake signals for establishing communication, as well as to data traffic communications after a communication link is established. The relative pattern position may be transmitted by the base station as part of the handshake signals.

For systems using base station derived forward link antenna diversity, the time hopping pattern for user stations may be limited to only, e.g., odd time slots (where base slots and user slots are each considered as independent time slots). The base station transmission follows in the even time slot immediately following the corresponding user slot. To avoid introducing undesired spectral components caused by the restriction to odd time slots, a "dead" time slot may be declared in a pseudo-random pattern so as to more evenly distribute user station transmissions over odd and even time slots.

A preferred TDMA system is disclosed wherein spread spectrum communication techniques are employed by base station and user station transmitters and receivers. Further variations and embodiments are also described in more detail below.

BRIEF DESCRIPTION OF THE DRAWINGS

The various objects, features and advantages of the present invention may be better understood by examining the Detailed Description of the Preferred Embodiments found below, together with the appended figures, wherein:

FIG. 5A is a frequency plot of the envelope spectrum of a transmitter in a TDMA system, and FIG. 5B is an enlargement of a portion of FIG. 5A.

FIG. 6 is a timing diagram illustrating a particular cyclic time hopping pattern in accordance with one embodiment of the present invention.

FIG. 7A is a frequency plot of the envelope spectrum of a transmitter using a 16-frame cyclic time hopping pattern, and FIG. 7B is an enlargement of a portion of FIG. 7A.

FIG. 13A is a frequency plot of the envelope spectrum of a transmitter using a 48-frame cyclic time hopping pattern, and FIG. 13B is an enlargement of a portion of FIG. 13A.

FIGS. 19A, 20A, 21A and 22A are plots of envelope spectrums of a transmitter using a 16-frame, 48-frame, 80-frame, and 144-frame, respectively, cyclic time hopping pattern in a 50% duty cycle TDMA system, and FIGS. 19B, 20B, 21B and 22B are enlargements of portions of FIGS. 19A, 20A, 21A and 22A, respectively.

FIG. 23 is a table showing an exemplary 16-frame time hopping sequence for a 16-slot communication system.

FIG. 24 is a table showing an exemplary 80-frame time hopping sequence for a 16-slot communication system.

DETAILED DESCRIPTION OF THE PREFERRED EMBODIMENTS

Figure 1:
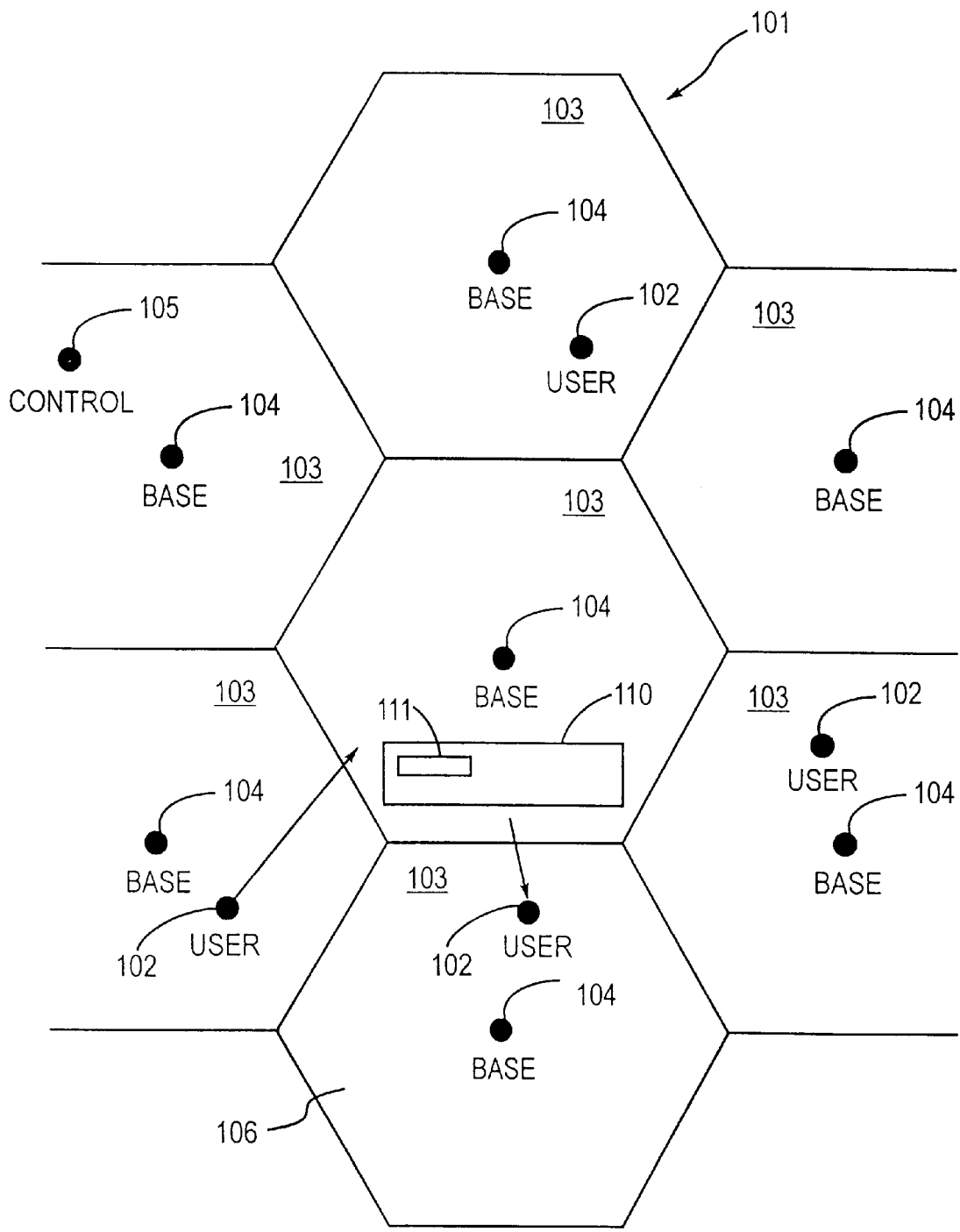
FIG. 1 is a diagram of a pattern of cells in a wireless communication system.

FIG. 1 is a diagram of a pattern of cells in a wireless communication system 101 for communication among a plurality of user stations 102. The wireless communication system 101 of FIG. 1 includes a plurality of cells 103, each with a base station 104, typically located at the center of the cell 103. Each station (both the base stations 104 and the user stations 102) generally comprises a receiver and a transmitter.

In a preferred embodiment, a control station 105 (also comprising a receiver and a transmitter) manages the resources of the system 101. The control station 105 assigns the base station 104 transmitters and user station 102 transmitters in each cell 103 a spread-spectrum code for modulating radio signal communication in that cell 103. The resulting signal is generally spread across a bandwidth exceeding the bandwidth necessary to transmit the data, hence the term "spread spectrum". Accordingly, radio signals used in that cell 103 are spread across a bandwidth sufficiently wide that both base station 104 receivers and user station 102 receivers in an adjacent cell 103 may distinguish communication which originates in the first cell 103 from communication which originates in the adjacent cell 106.

Figure 2:
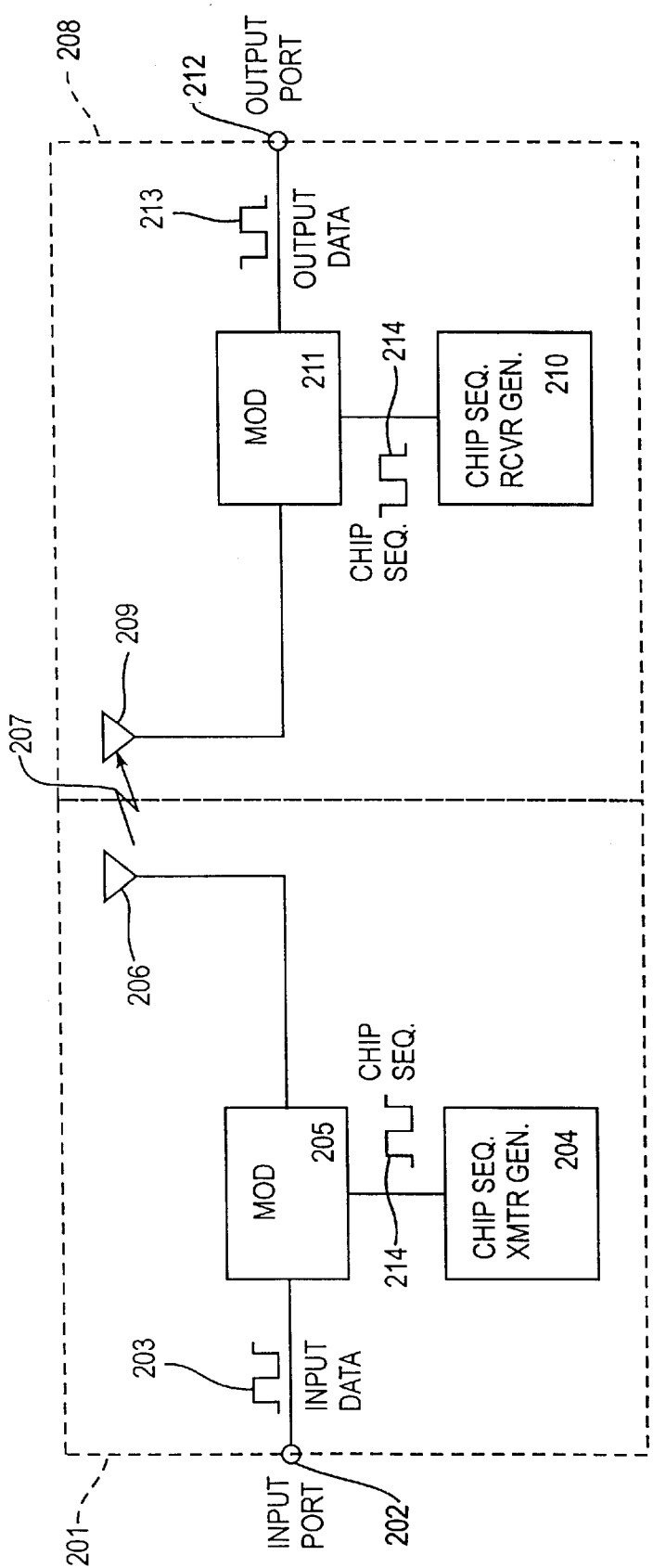
FIG. 2 is a block diagram of a spread spectrum communication system.

FIG. 2 is a block diagram of an exemplary spread spectrum communication system as may be employed for spreading and despreading signals in the communication system of FIG. 1. In FIG. 2, a spread-spectrum transmitter 201 comprises an input port 202 for input data 203, a chip sequence transmitter generator 204, a modulator 205, and a transmitting antenna 206 for transmitting a spread-spectrum signal 207. A spread-spectrum receiver 208 comprises a receiver antenna 209, a chip sequence receiver generator 210, a demodulator 211, and an output port 212 for output data 213. In operation, a single chip sequence 214 is identically generated by both the transmitter generator 204 and the receiver generator 210, and appears essentially random to others not knowing the spreading code upon which it is based. The spread-spectrum signal 207 is despread with demodulator 211 by correlating the received signal with a locally generated version of the chip sequence 214. Spread spectrum communication techniques are further described in, e.g., Robert C. Dixon, *Spread Spectrum Systems with Commercial Applications* (John Wiley & Sons, 3d ed. 1994).

Figure 3:
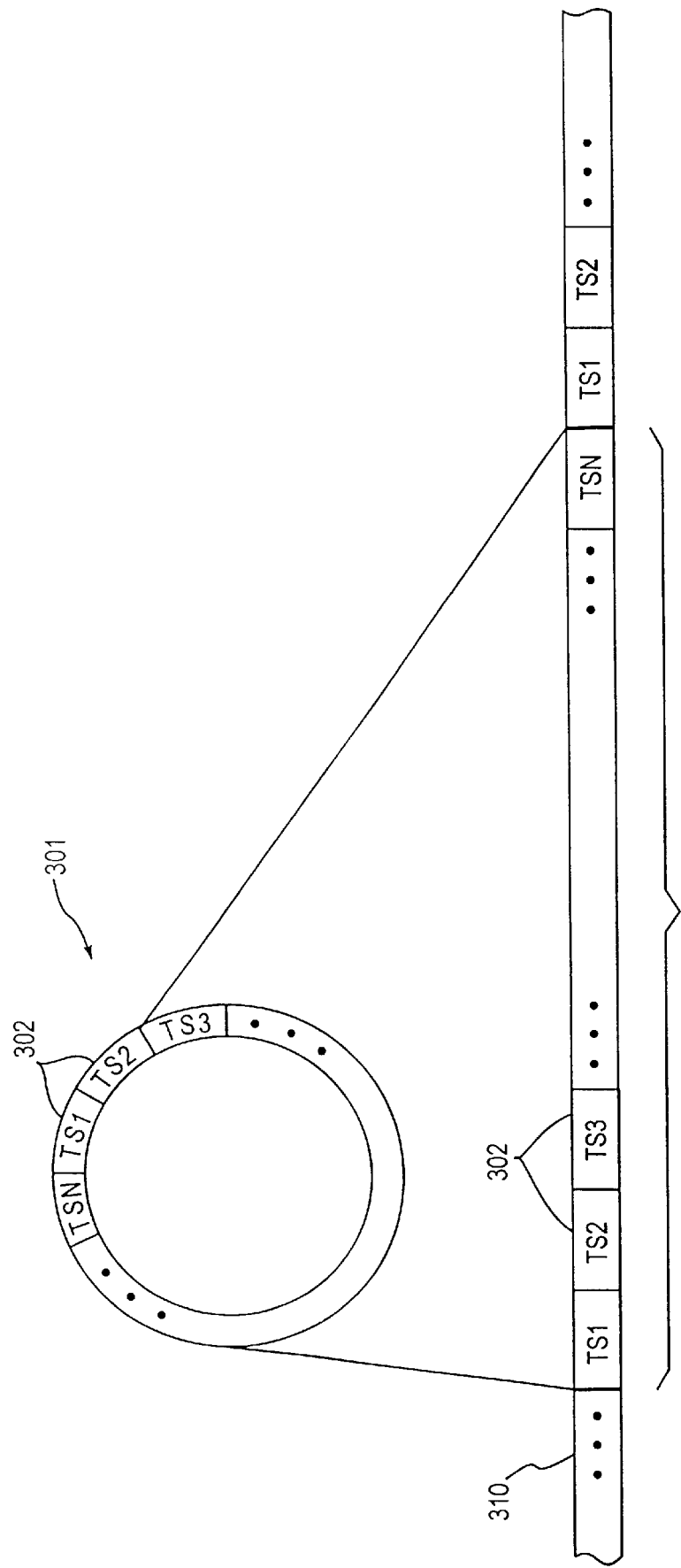
FIG. 3 is a diagram of a time frame divided into a plurality of time slots.

FIG. 3 is a diagram showing the timing structure of a particular TDMA system. According to the timing structure of FIG. 3, communication over time is broken into a continuous series of time frames 301. A single complete time frame 301 is shown along a timeline 310 in FIG. 3; similar time frames precede and follow time frame 301 in a continuous pattern along the timeline 310.

Time frame 301 is divided into a plurality of time slots 302 numbered consecutively TS1, TS2 . . . TSN, each of which may support communication with a single user station 102. Time frame 301 may be thought of as a "polling loop" or a time loop, as illustrated graphically in FIG. 3, whereby a base station 104 communicates with user stations 102 sequentially over the time frame 301 in a manner analogous to polling. In one embodiment, each user station 102 transmits and receives messages in its designated time slot 302. In such an embodiment, each time slot 302 generally comprises two portions—a user portion wherein a user station 102 transmits a user-to-base message to the base station 104, and a base portion wherein the base station 104 transmits a base-to-user message to a user station 102. Communication may be interleaved, such that user stations 102 transmit in one time slot 302 but receive in a different time slot 302. An exemplary interleaved TDD communication frame structure is disclosed, for example, in copending U.S. patent application Ser. No. 08/465,555 filed Jun. 5, 1995 which application is hereby incorporated by reference as if fully set forth herein.

Alternatively, time slots 302 may be assigned according to a protocol between the base station 104 and user stations 102 in communication therewith; in such an embodiment, each time slot 302 represents either a forward link or a reverse link transmission from or to a particular user station 102. Thus, where there are sixteen time slots 302, duplex communication may be supported for up to eight user stations 102.

Figure 4:
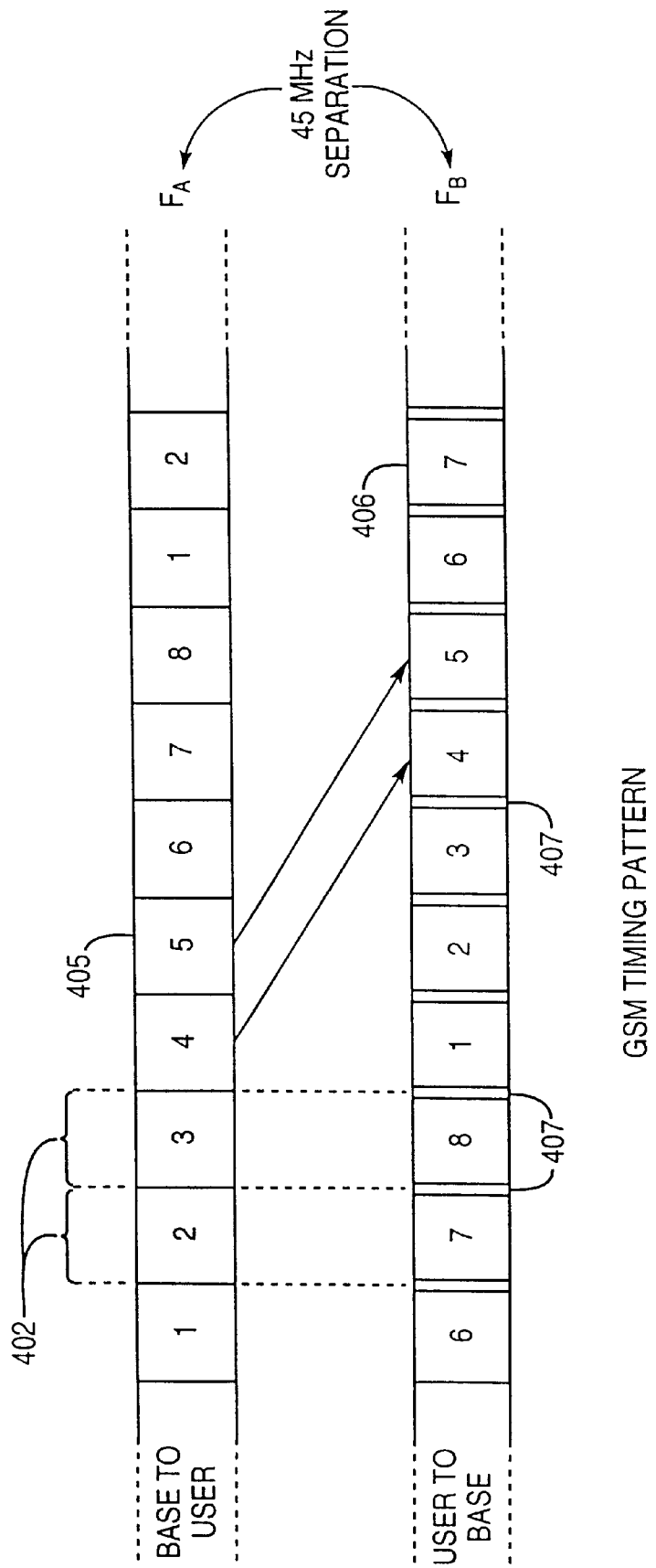
FIG. 4 is a diagram of a timing pattern for a TDMA system using different frequencies for base stations and user stations.

As an alternative, transmissions from user stations 102 and transmissions from the base station 104 may occur on different frequencies. An example of such a general communication structure is the Global System for Mobile communications ("GSM"). FIG. 4 illustrates a timing pattern for a GSM system. In FIG. 4, communication between a base station 104 and user stations 102 is divided into eight burst periods 402. Up to eight different user stations 102 can communicate with a base station 104, one in each burst period 402. Two separate frequency bands, denoted in FIG. 4 as FA and FBI are used. The base station 104 transmits over a first frequency band $F_A$, while the user stations transmit over a second frequency band $F_B$. After a user station 102 receives a base transmission 405 on the first frequency band $F_A$ during a particular burst period 402, the user station shifts in frequency by 45 MHz to the second frequency band $F_B$ and transmits a user transmission 406 in response to the base transmission 405 approximately three burst periods 402 later. The three burst period delay is assumed to be large enough to account for propagation time between the base station and the user station.

It is important in the GSM system that the user transmissions 406 received at the base station fit into the appropriate burst periods 402. Otherwise, the user transmissions 406 from user stations using adjacent burst periods 402 could overlap, resulting in poor transmission quality or even loss of communication due to interference between user stations. Accordingly, each burst period 402 is surrounded by a guard times 407 to account for uncertain signal propagation delays between the base station 104 and the user station 102. By comparing the time of the signal actually received from the user station 302 to the expected receive time, the base station 104 may command the user station 102 to advance or retard its transmission timing in order to fall within the proper burst period 402, a feature known as adaptive frame alignment, as described further in the GSM specification TS GSM 05.10.

While certain embodiments herein are described primarily with reference to features of FIG. 3, it is intended that the FIG. 3 diagram be a generic representation of a TDMA system in the sense that time slots 302 may be freely assigned to users according to the time hopping patterns mentioned herein. Thus, the time slots 302 may all comprise user slots, or may all comprise base slots, or may comprise both user slots and base slots. In the case where the time slots 302 are all user slots or all base slots, it may be assumed, for example, that the reverse link communications are carried out on a different frequency (e.g., as in the GSM system shown in FIG. 4).

In some embodiments, a user station 102 may communicate in more than one time slot 302 in each time frame 301, so as to support an increased data rate. Similarly, in some embodiments, a user station 102 may periodically skip time frames 301 and communicate in some subset of all time frames 301 (e.g., every other time frame 301, or every fourth time frame 301), so as to support a reduced data rate where a full speed communication link is not necessary. Further information about an exemplary TDMA system supporting variable data rates may be found in copending U.S. patent application Ser. No. 08/284,053 filed Aug. 1, 1994 in the name of inventors Gary B. Anderson, Ryan N. Jensen, Bryan K. Petch, and Peter 0. Peterson, originally entitled "PCS Pocket Phone/Microcell Over-Air Protocol," which application is hereby incorporated by reference as if fully set forth herein.

Communication between a user station 102 and a base station 104 may be established by any of a variety of means as known in the art. In an exemplary spread spectrum TDMA system, a user station 102 establishes communication with a base station 104 by responding to a general polling message in an available time slot 302, as described further herein with respect to FIG. 14. Further details regarding means for establishing communication (particularly spread spectrum communication) in a TDMA system may also be found in U.S. Pat. No. 5,455,822 issued Oct. 3, 1995 U.S. patent application Ser No. 08/284,053 filed Aug. 1, 1994 both of which are hereby incorporated by reference as if fully set forth herein.

In an exemplary TDMA communication system, time frames 301 are each 20 milliseconds in duration, and each time frame 301 comprises sixteen time slots 302. FIG. 5A is a frequency plot of an envelope spectrum of a user station transmitter in a TDMA system having 20 millisecond time frames 301; FIG. 5B is an enlargement of the upper portion of FIG. 5A. An envelope spectrum may be defined as the spectrum of the envelope of the transmitter's output. For the purposes of FIGS. 5A and 5B (which are Hamming window weighted), the user station 302 is assumed to transmit once every 20 milliseconds for a duration of 20 milliseconds/16 time slots, or 1.25 milliseconds. The envelope spectrum 501 shown in FIG. 5A exhibits a strong line structure with line spacings located 50 Hz apart; in other words, the energy of the transmission is relatively concentrated at specific frequencies.

The shape of the envelope spectrum 501 is a sin(x)/x pattern resulting primarily from the burst shape, which may be regarded as generally rectangular. Experiment has shown that, in the frequency range of interest, the envelope rise and fall characteristics have little influence on the shape of the envelope spectrum 501. Coupled to an unintended receiver (such as, e.g., a hearing aid), the transmitter signal illustrated by the graphs of FIGS. 5A and 5B could be perceived as an annoying low frequency 50 Hz tone with strong harmonic content.

In order to minimize the potential for such interference, the invention in one embodiment provides for cyclic time hopping in a TDMA communication system. FIG. 6 is a timing diagram of a cyclic time hopping system in accordance with one embodiment of the present invention. In FIG. 6, a TDMA communication system is assumed to have four time slots 602 in each time frame 601. Eight time frames 601 are shown. The time slots 602 occur sequentially in each time frame 601 from the bottom of the FIG. 6 chart to the top of the FIG. 6 chart. User stations 102 are identified by letters A, B, C and D.

The FIG. 6 chart shows, in each of eight time frames 601 (numbered consecutively TF1, TF2, . . . TF8), the time slot 602 assigned to each user station A, B, C and D. For example, in the first time frame TF1, user station A is assigned the first time slot TS1, user station B is assigned the second time slot TS2, user station C is assigned the third time slot TS3, and user station D is assigned the fourth time slot TS4. In the second time frame TF2, user station C is assigned the first time slot TS1, user station D is assigned the second time slot TS2, user station A is assigned the third time slot TS3, and user station B is assigned the fourth time slot TS4. The time slot assignment pattern continues as shown in the FIG. 6 chart. After the eight time frame TF8, the pattern repeats.

The relative time slot position of each of the user stations A, B, C and D therefore changes on a time-frame-by-time-frame basis. For example, user station A is assigned in the eight consecutive time frames 601 to time slots 601 in the following pattern: TS1, TS3, TS4, TS2, TS2, TS1, TS3, TS4. This 8-frame pattern repeats cyclically for user station A for each subsequent series of time frames 601. Likewise, the 8-frame patterns for user stations B, C and D also cyclically repeat for subsequent series of time frames 601. Given a "root pattern" $P_0$ (i.e., the pattern for the "first" user station A), the time hopping pattern $P_i$ for any other user station can, in one embodiment, be determined according to equation 610 below:

$$P_i = \mathrm{mod}(P_0 + i - 2, n_{slots}) + 1 \quad (610)$$

where i=1 . . . $n_{slots}$; nslots is the number of time slots in the system; "mod" represents a modulus operation; and $P_0$ is the root hopping pattern. For a 4-slot TDMA communication system, $n_{slots}$ is four, and the "mod" symbol therefore would represent a modulo-4 operation.

As an example, given the above described pattern for user station A, the pattern for user station B (i.e., user station 2, or i=2) may be determined as follows:

mod(1+2−2, 4)+1=mod(1, 4)+1=2 mod(3+2−2, 4)+1=mod(3, 4)+1=4 mod(4+2−2, 4)+1=mod(4, 4)+1=1 mod(2+2−2, 4)+1=mod(2, 4)+1=3 mod(2+2−2, 4)+1=mod(2, 4)+1=3 mod(1+2−2, 4)+1=mod(1, 4)+1=2 mod(3+2−2, 4)+1=mod(3, 4)+1=4 mod(4+2−2, 4) 30 1=mod(4, 4)+1=1

Thus, the 8-frame time hopping pattern for user station B is TS2, TS4, TS1, TS3, TS3, TS2, TS4, and TS1. The time hopping pattern for user stations C and D may be determined in a similar manner.

As a feature of this embodiment, in each time slot 602, user stations A, B, C and D appear in consecutive order in a ring-type pattern. Thus, user station B follows user station A in each time slot 602; user station C follows user station B in each time slot 602; and so on (unless the user station is assigned the first time slot TS1, in which case it does not follow any other user station in that particular time frame 601).

FIG. 23 is a table showing a 16-frame cyclic time hopping pattern for a 16-slot TDMA communication system. The left column 2301 of the FIG. 23 table indicates the relative time frame number (determined by taking the absolute time frame number, dividing by 16 and adding one to the resulting modulus), and the right column 2302 of the FIG. 23 table indicates the relative time slot number for the root pattern. The time slot position for each user station 102 is determined from the root pattern in a manner similar to the FIG. 6 time hopping pattern, according to the formula $P_i = \mathrm{mod}(P_0 + i - 2, n_{slots}) + 1$ (i.e., equation 610 above). For a 16-slot TDMA communication system, $n_{slots}$ is sixteen, and the "mod" symbol therefore would represent a modulo-16 operation.

In general, the root pattern may be derived by generating a pseudorandom number sequence accommodating the constraints of a specific system. For example, root patterns described herein have been derived using a standard random number generator. There is no requirement that the root pattern start with the first time slot, or any particular time slot. Preferably, orthogonal time hopping patterns are selected for all of the user stations 102 such that none of the user stations 102 are simultaneously assigned the same time slot 602 in the same time frame 601, or else interference or jamming could result. Use of equation 610 to develop time hopping patterns for all user stations 102 from a root pattern is one method for achieving orthogonal time hopping patterns.

One effect of pseudorandom time hopping patterns is to alter the envelope spectrum of a TDMA transmitter, particularly in regard to relative amplitude. FIG. 7A is a frequency plot of the envelope spectrum of a transmitter using the cyclic time hopping system of FIG. 23, and FIG. 7B is an enlargement of the upper portion of FIG. 7A. FIGS. 7A and 7B are Hamming window weighted (as all are similar graphs appearing in the drawings). In comparison with the spectral plot for the non-time hopping TDMA transmitter as shown in FIGS. 5A and 5B, it can be seen that the highest spectral components for the graph shown in FIGS. 7A and 7B are decreased by roughly 6 dB over the plot shown in FIGS. 5A and 5B. The use of cyclic time hopping therefore reduces potential interference by a TDMA transmitter.

Figure 9A:
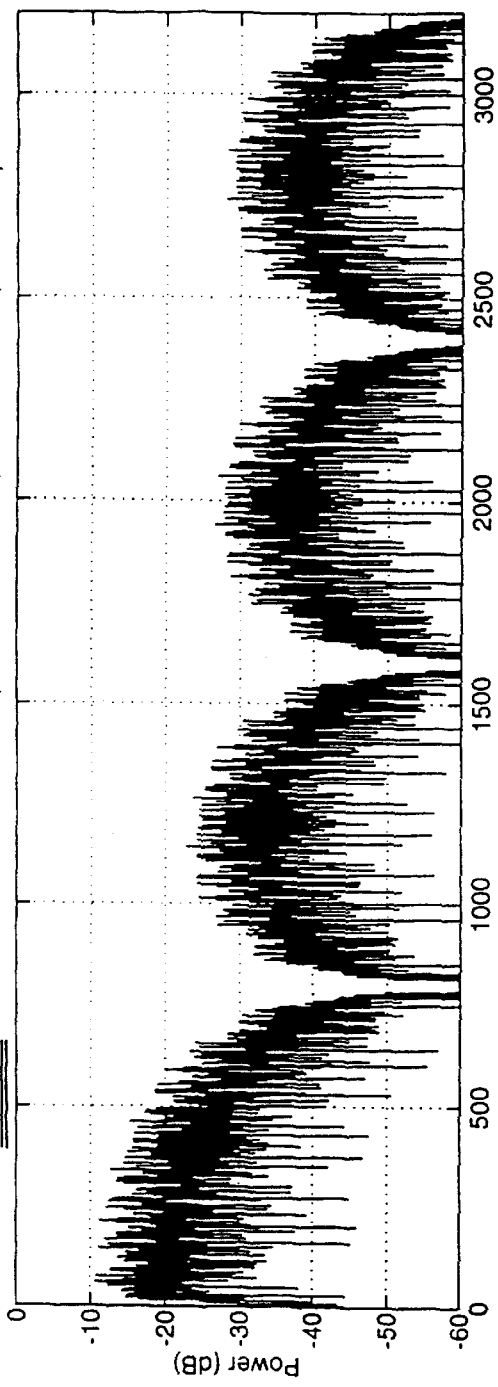
FIG. 9A is a frequency plot of the envelope spectrum of a transmitter using a 80-frame cyclic time hopping pattern.
Figure 9B:
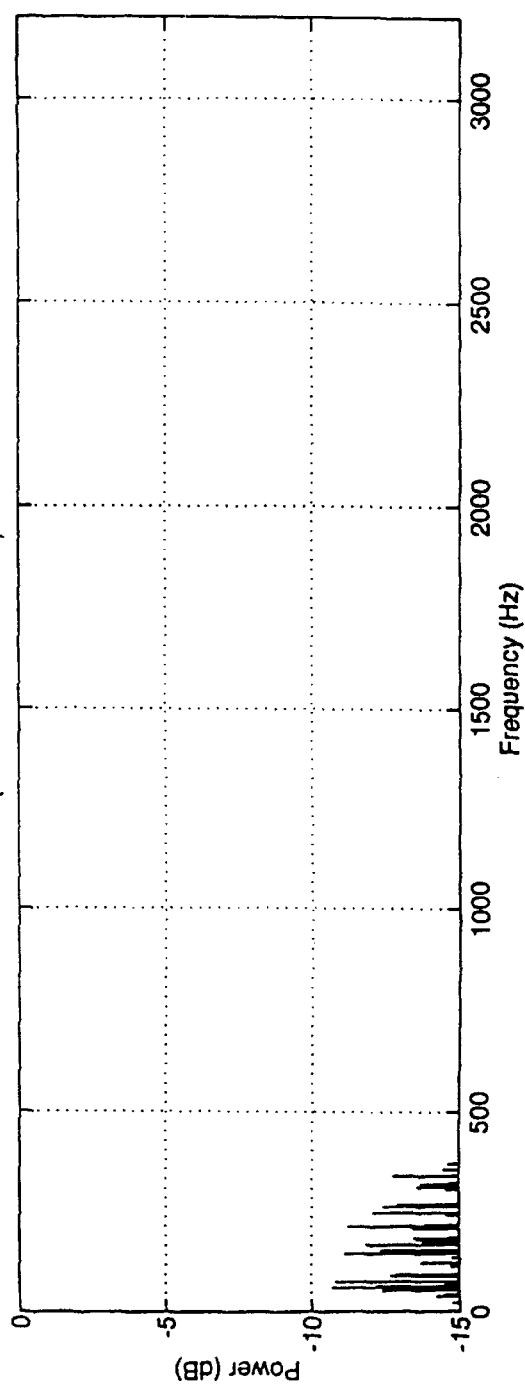
FIG. 9B is an enlargement of a portion of FIG. 9A.

The envelope spectrum can be made increasingly noise-like by extending the time hopping pattern so that it repeats with a longer period. FIG. 24, for example, is a table showing a 16-frame cyclic time hopping pattern for a 16-slot TDMA communication system. FIG. 9A is a frequency plot of the envelope spectrum of a transmitter using the cyclic time hopping system of FIG. 24, and FIG. 9B is an enlargement of the upper portion of FIG. 9A. In comparison with the spectral plot for the non-time hopping TDMA transmitter as shown in FIGS. 5A and 5B, the highest spectral components for the graph shown in FIGS. 9A and 9B are decreased by roughly 11 dB over the graph shown in FIGS. 5A and 5B. Extending the time hopping pattern can therefore further reduce potential interference from a TDMA transmitter.

Figures 8A, 8B:
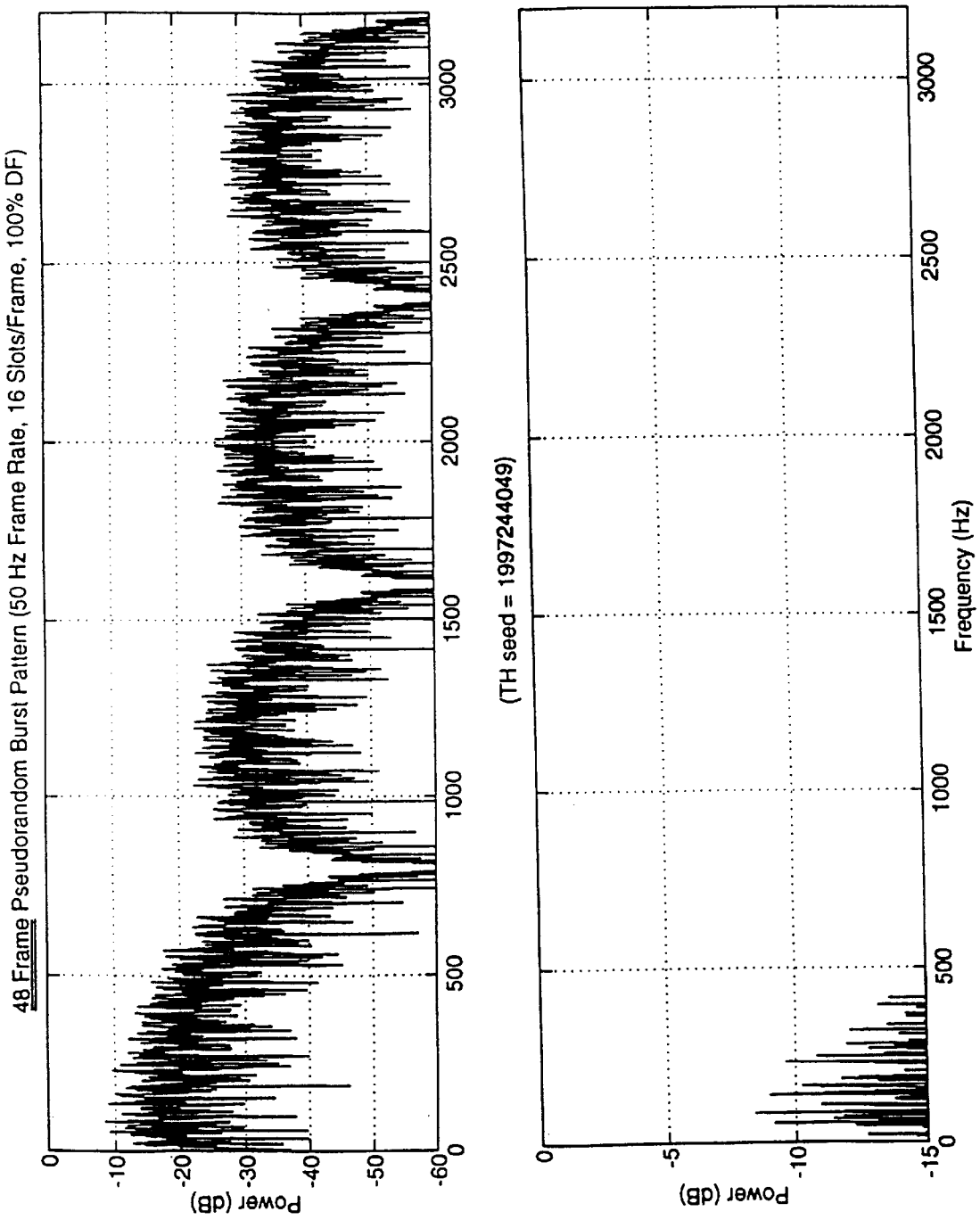
FIG. 8A is a frequency plot of the envelope spectrum of a transmitter using a 48-frame cyclic time hopping pattern.
FIG. 8B is an enlargement of a portion of FIG. 8A.
Figure 10A:
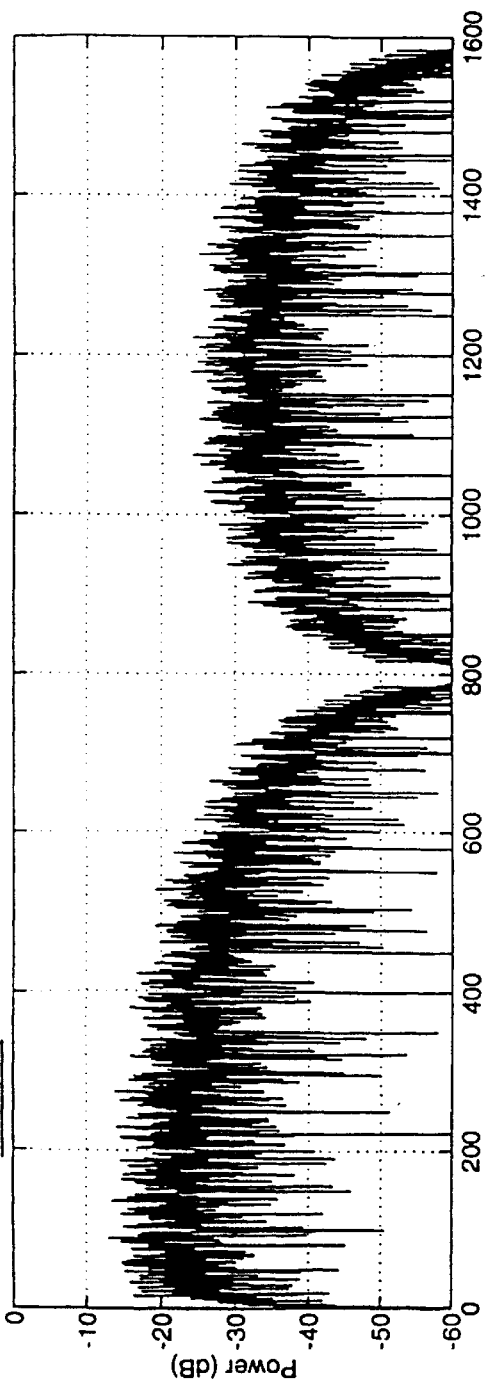
FIG. 10A is a frequency plot of the envelope spectrum of a transmitter using a 144-frame cyclic time hopping pattern.
Figure 10B:
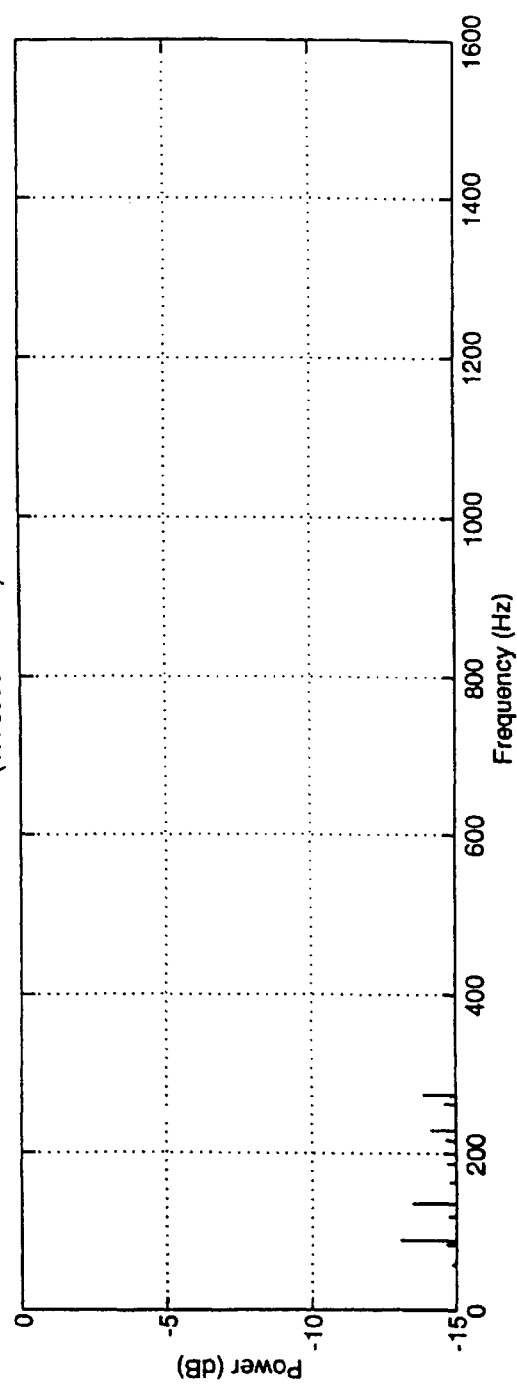
FIG. 10B is an enlargement of a portion of FIG. 10A.

Likewise, FIGS. 8A and 8B are different scale frequency plots of the envelope spectrum of a transmitter using a 48-frame cyclic time hopping pattern in a 16-slot system, showing about an 8 dB improvement over the spectrum of FIGS. 5A and 5B. FIGS. 10A and 10B are different scale frequency plots of the envelope spectrum of a transmitter using a 144-frame cyclic time hopping pattern in a 16-slot system, showing about a 13 dB improvement over the spectrum of FIGS. 5A and 5B.

The effect of extending the time hopping pattern is summarized below in Table 6-1.

TABLE 6-1

| Time Hopping Pattern Repetition Interval | | Largest Non-DC Line |
|---|---|---|
| (Frames) | (Seconds) | (dB wrt to DC line) |
| 16 | 0.32 | −6 |
| 48 | 0.96 | −8 |
| 80 | 1.60 | −11 |
| 144 | 2.88 | −13 |

As shown in Table 6-1, as the number of frames in the time hopping pattern increases, the number of seconds between pattern repetitions for a given user station 102 also correspondingly increases. As the length of time between pattern repetitions increases, the relative amplitude of the envelope spectrum decreases.

The orthogonal time hopping patterns generated by applying equation 610 above are not necessarily simple time shifts of the root pattern. Consequently, envelope spectra for the different user stations 102 are not identical. The envelope spectra may be compared in terms of delta time weight distribution. For the purposes of the present invention, delta time may be defined as the time between transmissions from a given user station 102. Delta time weight distribution may be defined as a measure of how often a given delta time occurs. In terms of delta time wight distribution of the generated orthogonal time hopping patterns, it has been shown by experiment that most or all of the patterns generated have very similar weight distributions. Accordingly, it is expected that all of the generated patterns would have similar spectral densities for their envelope spectrums.

Figure 11A:
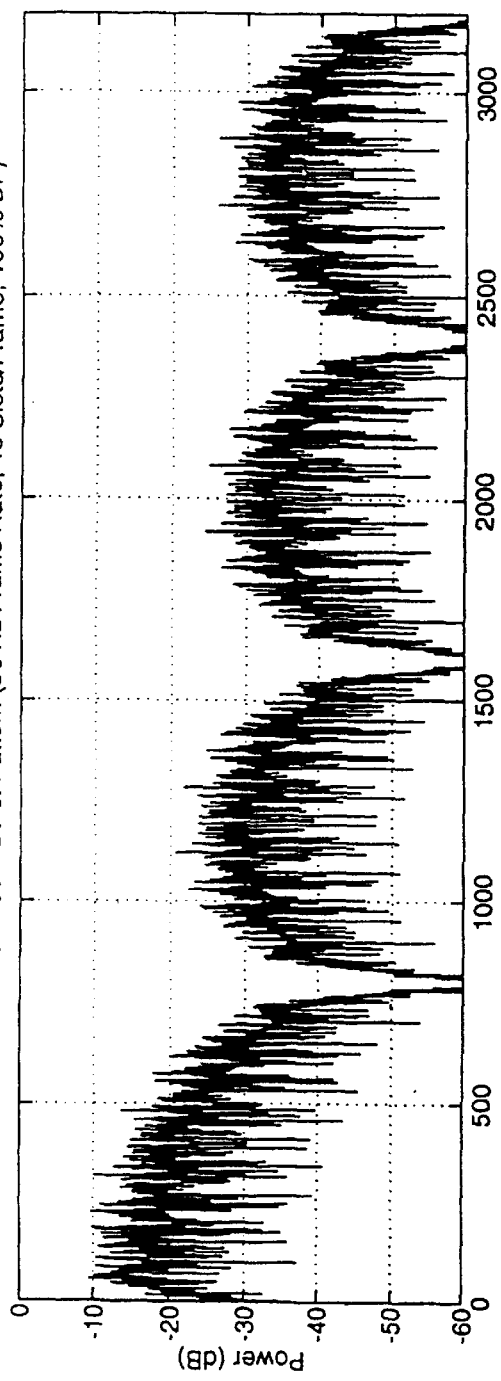
FIG. 11A is a frequency plot of the envelope spectrum of a transmitter using a 48-frame cyclic time hopping pattern.
Figure 11B:
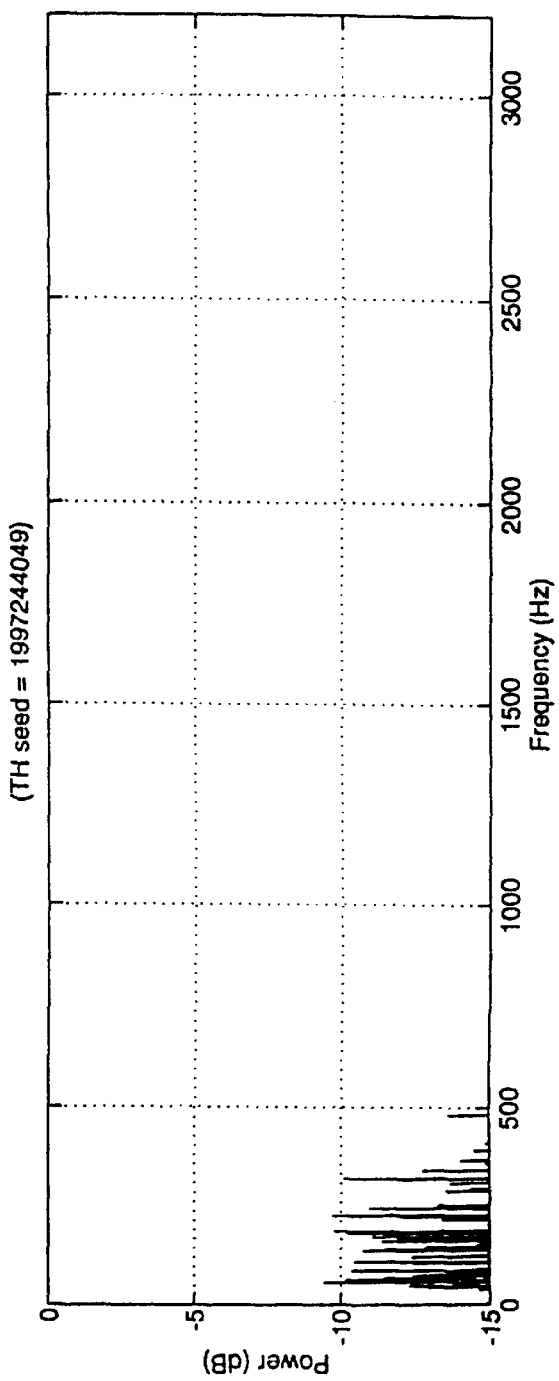
FIG. 11B is an enlargement of a portion of FIG. 11A.
Figures 12A, 12B:
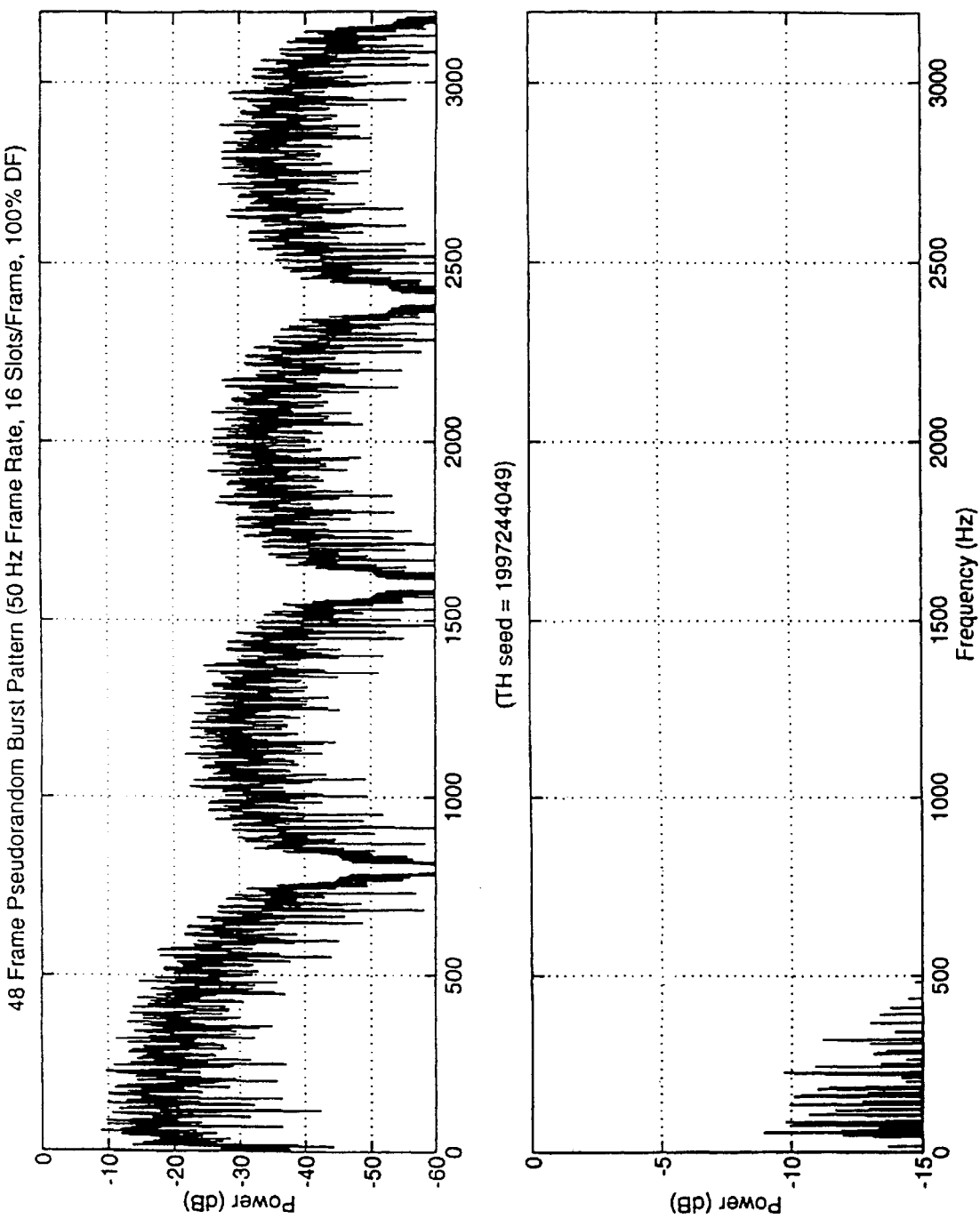
FIG. 12A is a frequency plot of the envelope spectrum of a transmitter using a 48-frame cyclic time hopping pattern.
FIG. 12B is an enlargement of a portion of FIG. 12A.

For example, FIGS. 11A through 13B are plots of the envelope spectrum of a transmitter using the same 48-frame root pattern used to generate the spectral plots shown in FIGS. 8A and 8B, but with user stations 102 assigned to different positions. FIGS. 11A and 11B are graphs of the envelope spectrum for the second user station 102 in the 48-frame time hopping pattern (i.e., i=2 in equation 610); FIGS. 12A and 12B are graphs of the envelope spectrum for the third user station in the 48-frame time hopping pattern (i.e., i=3 in equation 610); and FIGS. 13A and 13B are graphs of the envelope spectrum for the fourth user station 102 in the 48-frame time hopping pattern (i.e., i=4 in equation 610). While the graphs of FIGS. 11A, 12A and 13A are similar, they are not exactly the same. This can also be seen by a comparison of the enlargements thereof shown in FIGS. 11B, 12B and 13B.

Although it is expected that all of the generated patterns from a given root pattern should have similar spectral densities for their envelope spectrums, to ensure optimal system performance and prevent aberrations the envelope spectrums for all of the time hopping patterns generated for a system should be examined prior to selection and implementation of a particular root pattern.

Figures 15A, 15B:
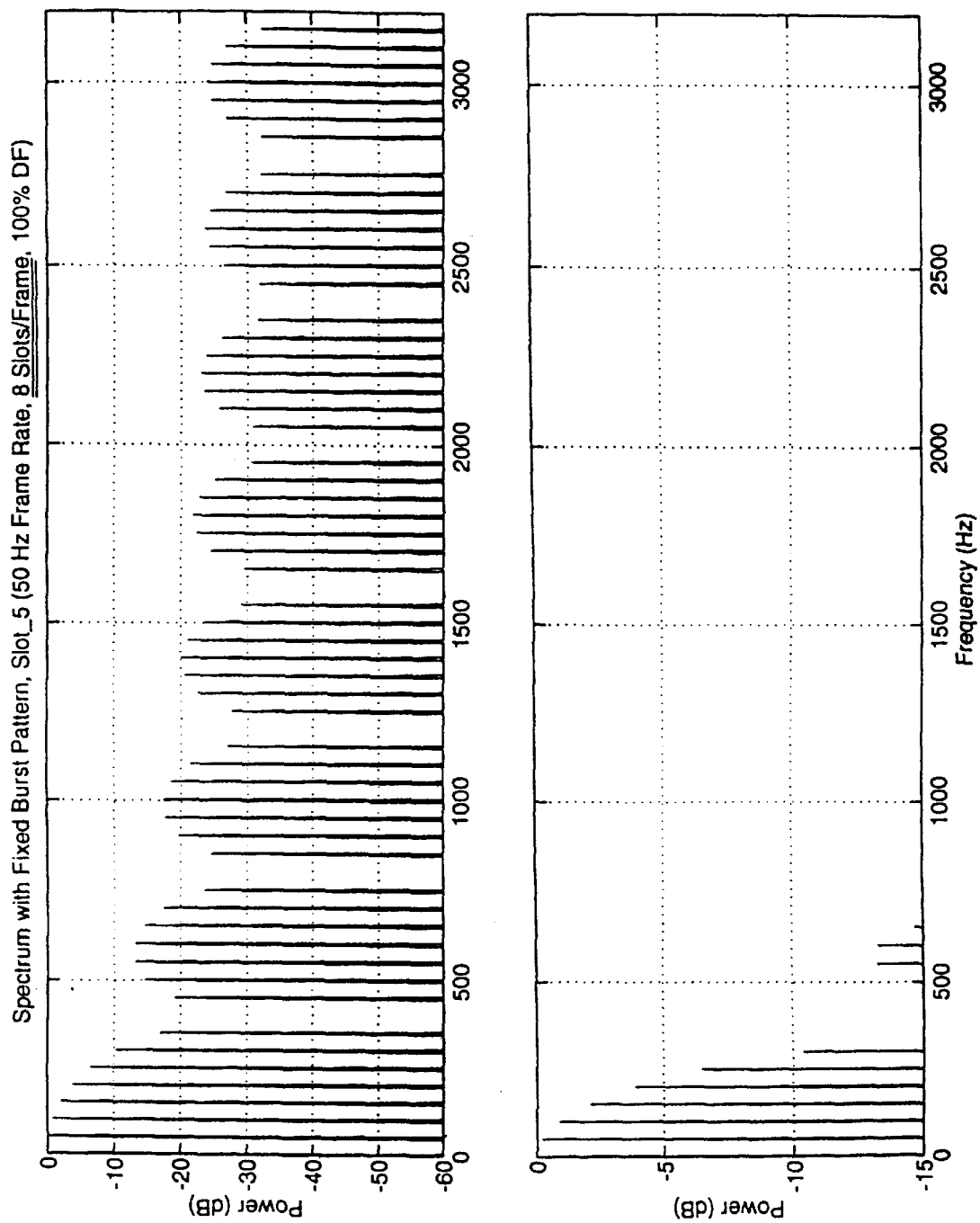
FIG. 15A is a frequency plot of the envelope spectrum of a transmitter in a TDMA system with eight time slots per time frame.
FIG. 15B is an enlargement of a portion of FIG. 15A.

The number of time slots 302 in each time frame 301 may affect the envelope spectrum of a TDMA transmitter. In particular, for a given time frame rate, decreasing the number of time slots 302 increasingly attenuates high frequency spectral components as a result of the $\sin(x)/x$ spectral shape. FIG. 15A, for example, is a plot of the envelope spectrum of a TDMA transmitter in an 8-slot per time frame system, without the use of time hopping. FIG. 15B is an enlargement of the upper portion of FIG. 15A. As compared to the envelope spectrum of the 16-slot system depicted in FIGS. 5A and 5B, the higher frequencies in the envelope spectrum of FIGS. 15A and 15B decrease more rapidly due to the $\sin(x)/x$ weighting component. The DC component of the 8-slot system is, however, 3 dB higher than that of the 16-slot system.

Figures 16A, 16B:
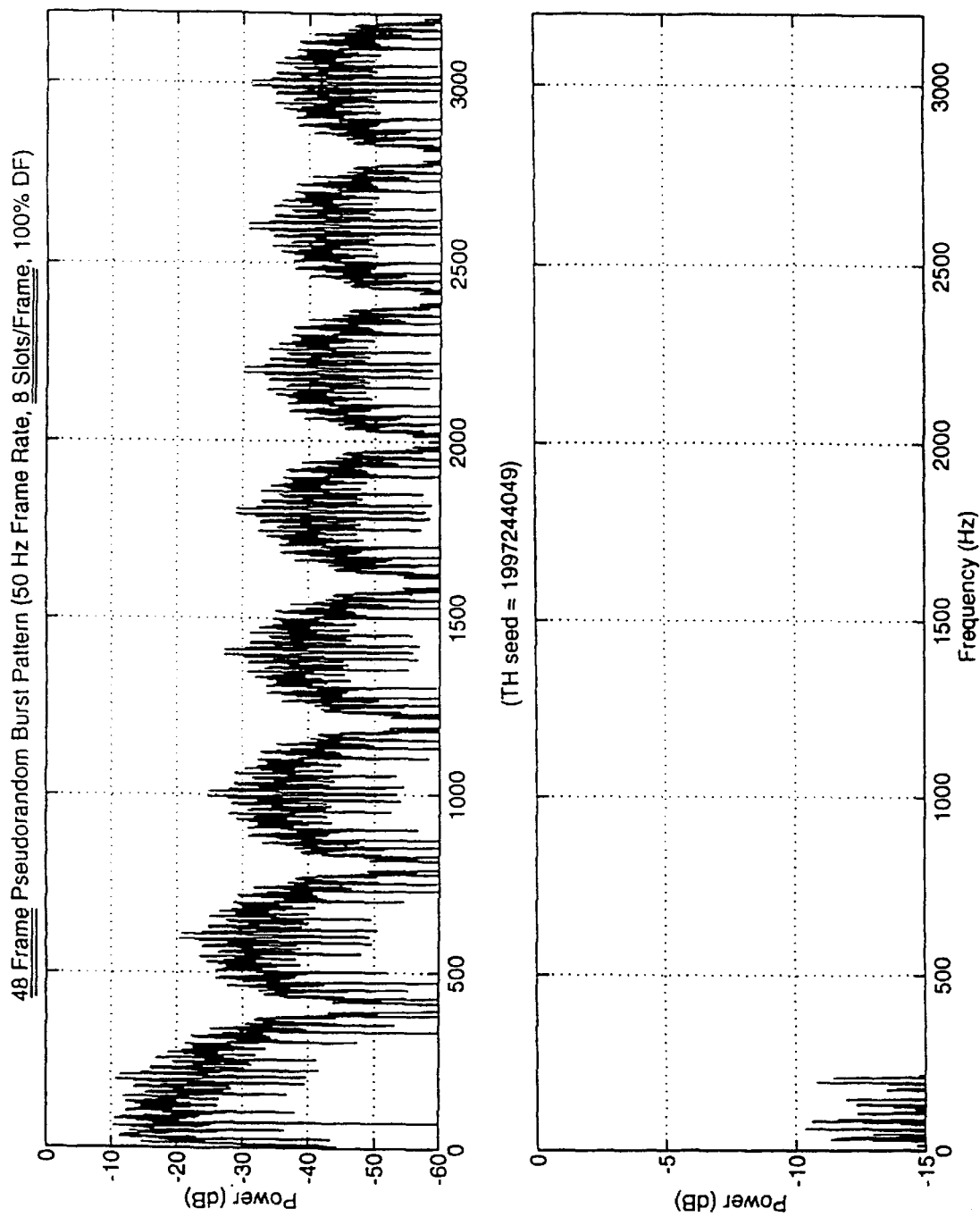
FIG. 16A is a frequency plot of the envelope spectrum of a transmitter using a 48-frame cyclic time hopping pattern in an 8-slot per frame TDMA system.
FIG. 16B is an enlargement of a portion of FIG. 16A.

FIG. 16A is a plot of the envelope spectrum of a TDMA transmitter using a 48-frame cyclic time hopping pattern in an 8-slot per frame TDMA system. FIG. 16B is an enlargement of the upper portion of FIG. 16A. Compared to the envelope spectrum of the 16-slot system depicted in FIG. 8A, non-DC spectral lines in the FIG. 16A graph are reduced by about 3 dB with respect to the DC component. But because the DC component of the 8-slot system is 3 dB higher than that of the 16-slot system, in absolute terms the maximum amplitude spectral components are about the same size, but with half as high a frequency as the FIG. 8A envelope spectrum graph.

Some TDMA systems may be restricted in their time slot usage depending on decision senescence requirements—i.e., the amount of time permitted for response to received information before it becomes stale. The particular time hopping patterns discussed so far are preferably employed in a system wherein time slots 302 can be assigned to the time hopping pattern without restriction, thus having relatively loose senescence requirements. For example, the general time hopping patterns discussed so far may be particularly suitable to deploy in systems such as PACS-UA or PACS-UB (i.e., unlicensed versions of the PACS system), or the Digital European Cordless Telecommunications (DECT) system, each of which at least in principle permits unrestricted assignment of time slots into the time hopping pattern. The DECT and PACS systems are not generally intended for full vehicular mobility and can therefore withstand relatively substantial decision senescence. By way of illustration, for a user station 102 communicating at 1900 MHz and traveling at six miles per hour, decorrelation (measuring ¼·λ) takes approximately 14.7 milliseconds. Given the relatively short duration of the time frames involved (PACS uses a 2.5 millisecond time frame, and DECT uses a 10 millisecond time frame), neither the PACS nor DECT systems would suffer significantly from use of a fully interleaved time hopping pattern such as those that have been heretofore discussed.

Further, TDMA systems employing different frequencies for the base station 104 and the user stations 102 should also be relatively unrestricted as far as time slot allocation is concerned. Thus, the GSM system of FIG. 4 described previously could, in one embodiment, allow unrestricted time slot allocation to the time hopping pattern of user time slots 406 on user station frequency $F_B$. Because the base station 104 in a GSM system transmits at up to 100% duty cycle, independent cyclic time hopping for the base station 104 on the base station frequency $F_A$ will usually be unnecessary. However, to maintain synchronicity for such features as timing advance, the base station slots 405 will generally be time hopped in the same pattern as and in advance of the user station slots 406.

Where time slot allocation is restricted, however, there may be additional effects on the resulting envelope spectrum. This situation may occur, for example, in time division duplex communication systems relying on base station derived forward link antenna diversity, and particularly those systems which cannot withstand significant decision senescence (e.g., where user stations 102 reach high vehicle speeds). In some such systems, it is required that the base station 104 transmit immediately following a user station 102 transmission. This requirement prevents unrestricted allocation of time slots to the time hopping pattern, in that it restricts user station transmissions to odd time slots, and base station transmissions to the immediately following even time slots. Thus, a 16-slot time division duplex communication system may be though of as a 32-slot TDMA system with user stations 102 restricted to odd numbered time slots and base stations 104 restricted to even numbered time slots.

Figure 17A:
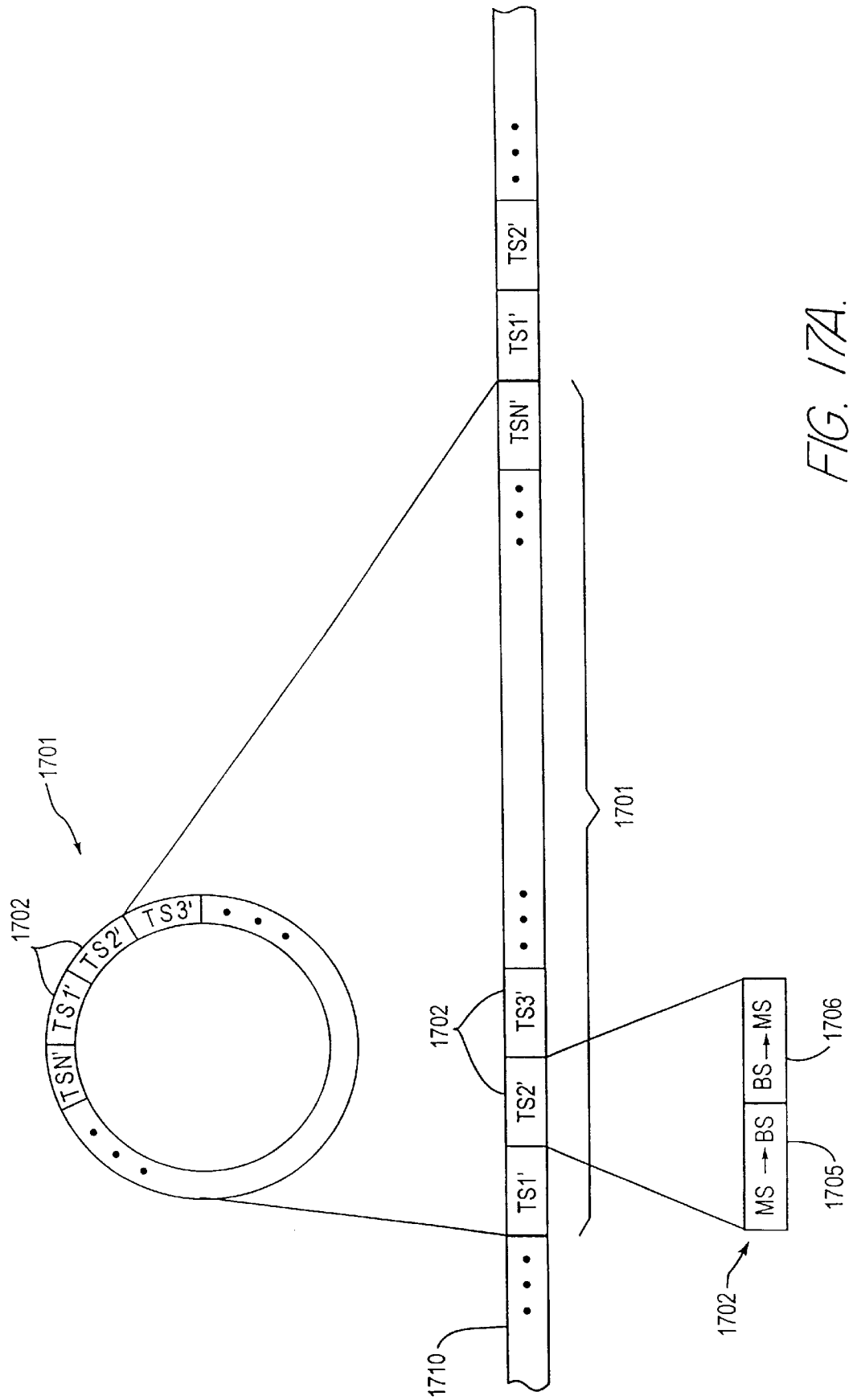
FIG. 17A is a timing diagram for a particular TDD communication system.

FIG. 17A is a timing diagram for a time division duplex (TDD) system and is essentially a subset of the FIG. 3 TDMA system described previously, but with base station transmissions restricted to immediately following the user station transmissions. As with FIG. 3, communication over time is broken into a continuous series of time frames 1701. A single complete time frame 1701 is shown along a timeline 1710; similar time frames are assumed to precede and follow time frame 1701 in a continuous pattern along the timeline 1710.

Time frame 1701 is divided into a plurality of time slots 1702 numbered consecutively TS1', TS2'. . . TSN', each of which may support duplex communication between the base station 104 and a user station 102. Time frame 1701 may be thought of as a "polling loop" or a time loop, as illustrated in FIG. 17A, whereby the base station 104 communicates with user stations 102 sequentially over the time frame 1701 in a manner analogous to polling, each user station 102 transmitting and receiving messages in its designated time slot 1702. In the FIG. 17A embodiment, each time slot 1702 comprises a user portion (or user slot) 1705 wherein a user station 102 transmits a user-to-base message to the base station 104, and a base portion (or base slot) 1706 wherein the base station 104 transmits a base-to-user message to the user station 102. Because user stations 102 only transmit in half of the time slots 1702, the FIG. 17A system may be considered a 50% duty cycle system. A preferred system in accordance with FIG. 17A has either sixteen time slots 2602 in each time frame 2601, or, alternatively, thirty-two time slots 2602 in each time frame 2601.

Figure 17B:
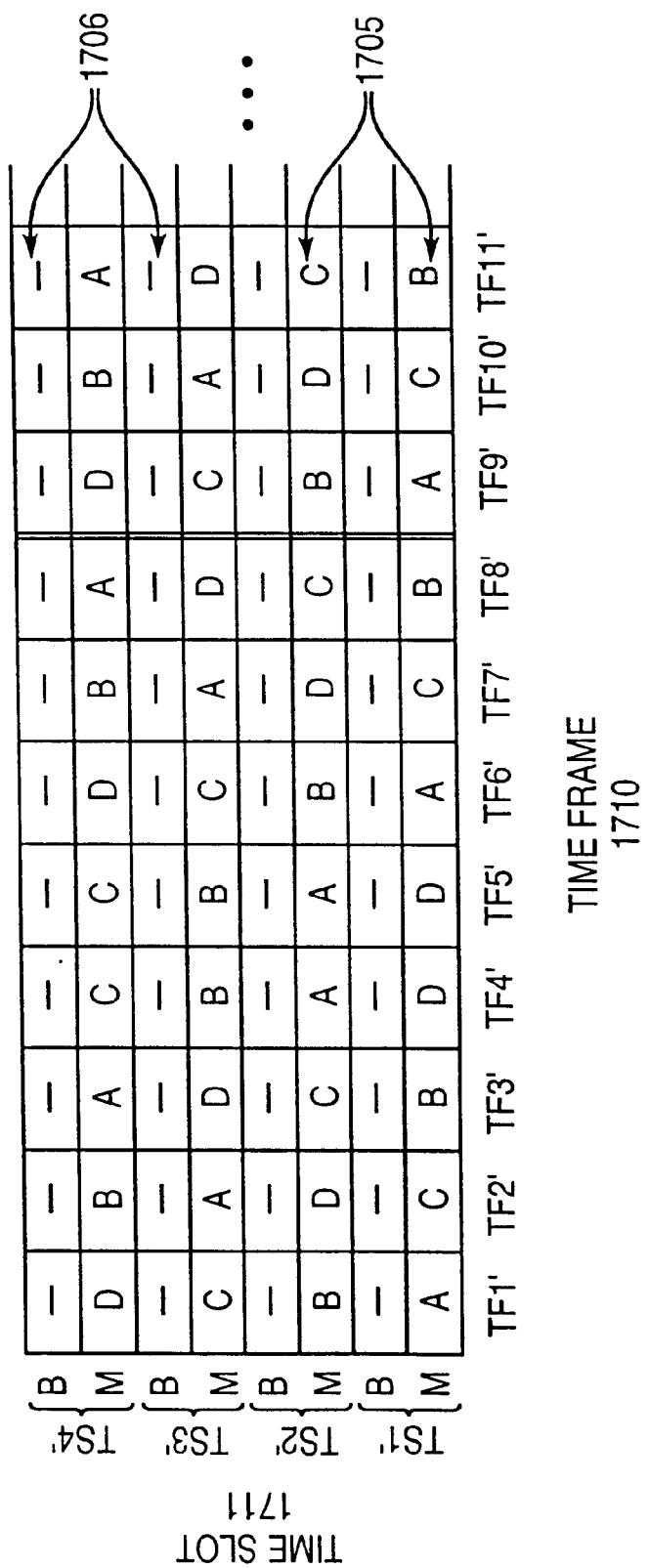
FIG. 17B is a timing diagram of showing a particular cyclic time hopping pattern for the TDD system of FIG. 17A.

FIG. 17B is a timing diagram of showing a particular cyclic time hopping pattern for the TDD system of FIG. 17A. The time hopping pattern used for FIG. 17B is the same pattern used in FIG. 6, but restricted to user slots 1705. The same time hopping pattern is used for the base slots 1706, such that the base station 104 immediately responds to a user station 102 with a reverse link transmission in the base slot 1706 after receiving a forward link transmission in the corresponding user slot 1705.

As shown in FIG. 17B, the time hopping pattern for user stations 102 is restricted to the user slots 1705. Viewing the user slots 1705 and base slots 1706 as independent time slots, this restriction is equivalent to limiting the time hopping pattern for user stations 102 only to "odd" time slots. Likewise, the time hopping pattern for the base station 104 is limited to only "even" time slots.

Figures 18A, 18B:
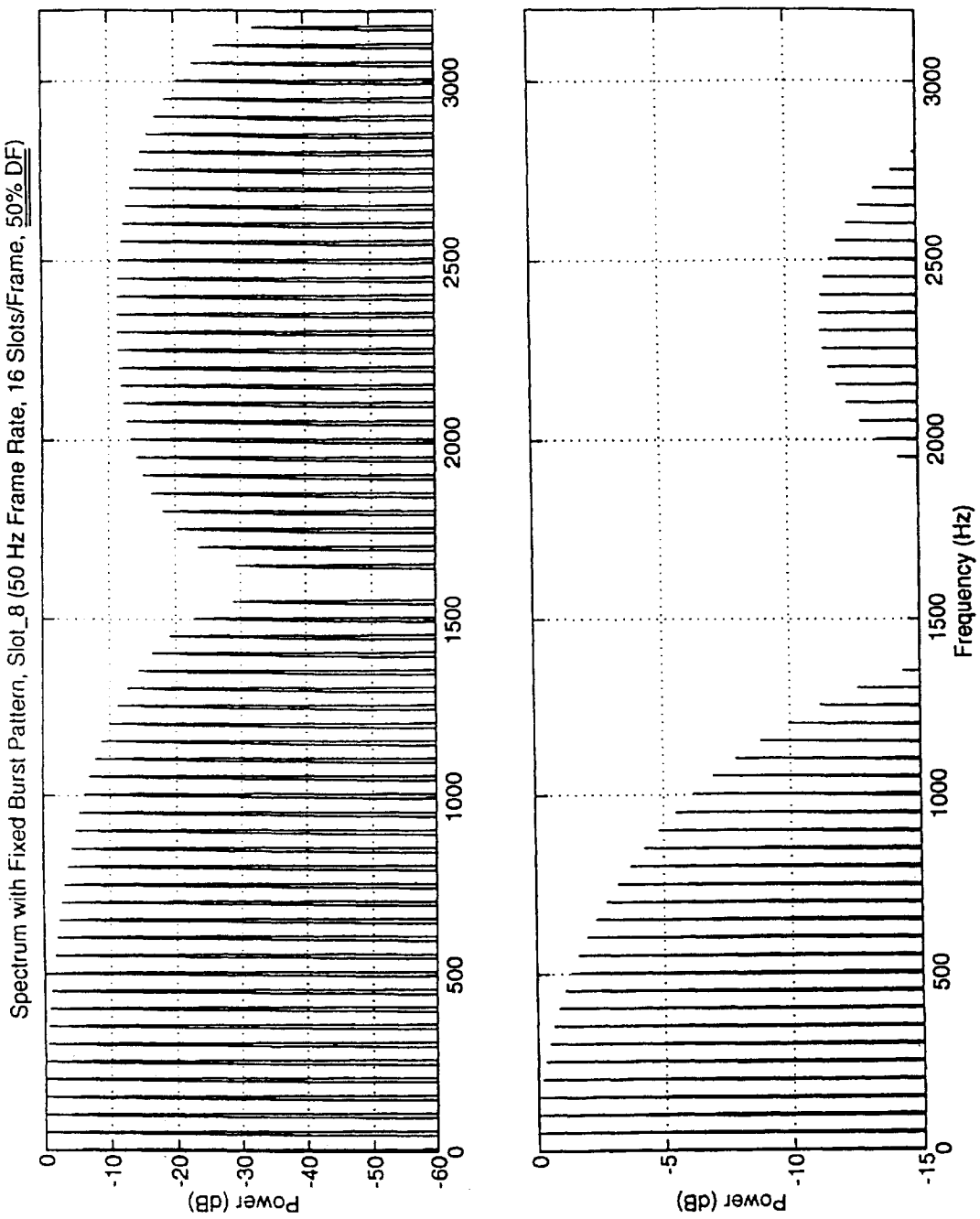
FIG. 18A is a plot of the envelope spectrum of a the TDMA transmitter in the FIG. 17A system.
FIG. 18B is an enlargement of a portion of FIG. 18A.

A user station 102 in the TDD system of FIG. 17A not employing time hopping has an envelope spectrum as depicted in the graph of FIG. 18A, an enlargement of which appears in FIG. 18B. The transmission burst of the user station 102 is half the duration of that in the FIG. 6 system described earlier (e.g., for FIG. 18A is 20 milliseconds/32 time slots=0.625 milliseconds/time slot). In comparison with the FIG. 6 system, the reduced transmission burst length results in an increase in the sin(x)/x spectral width, as reflected in the graph of FIG. 18A.

When time hopping is employed under the restrictions noted with respect to FIG. 17B, then the envelope spectrum is generally attenuated as the number of time frames 1701 in the time hopping pattern increases, as illustrated in FIGS. 19A through 22B.

Figures 19A, 19B:
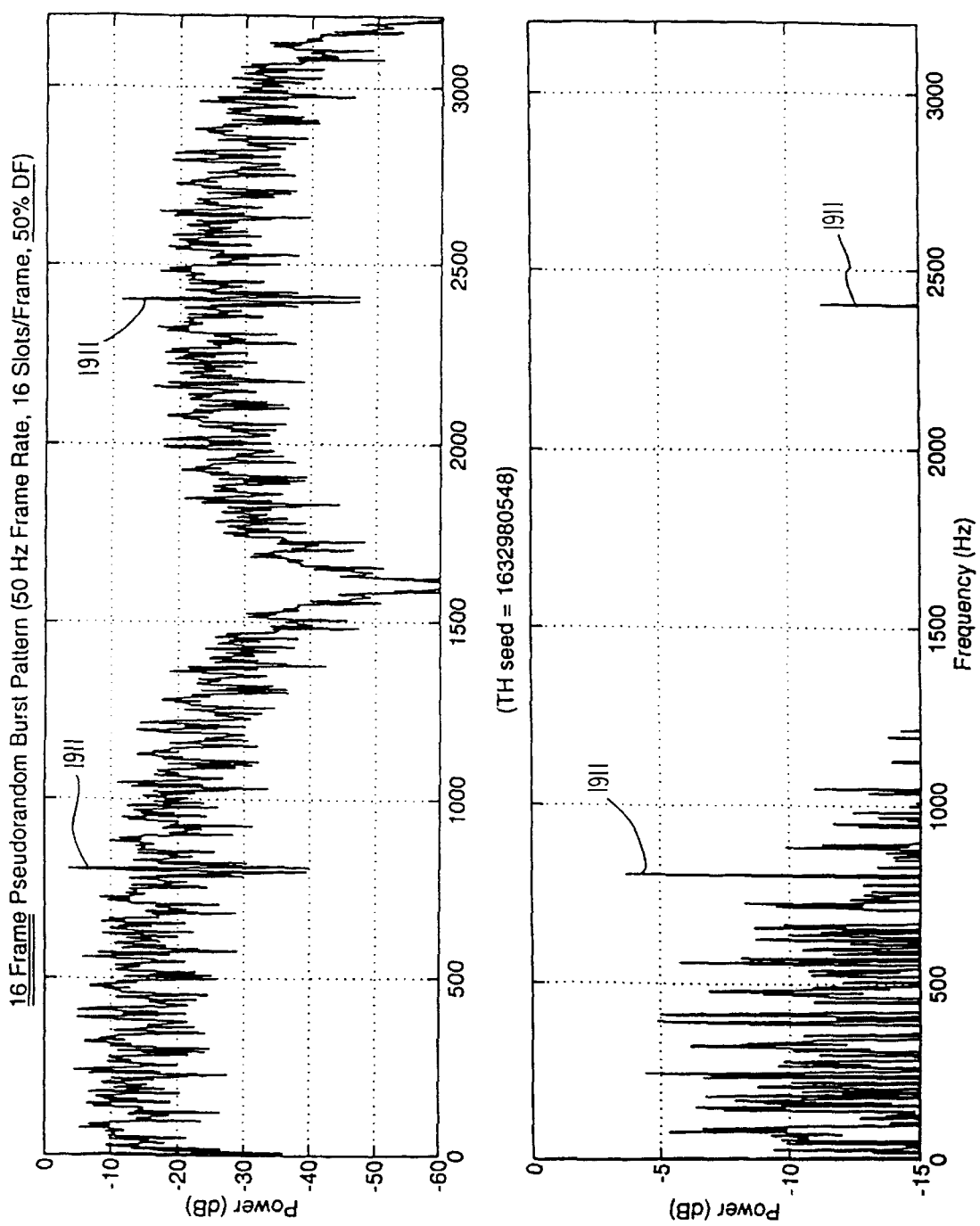
Figure 20A:
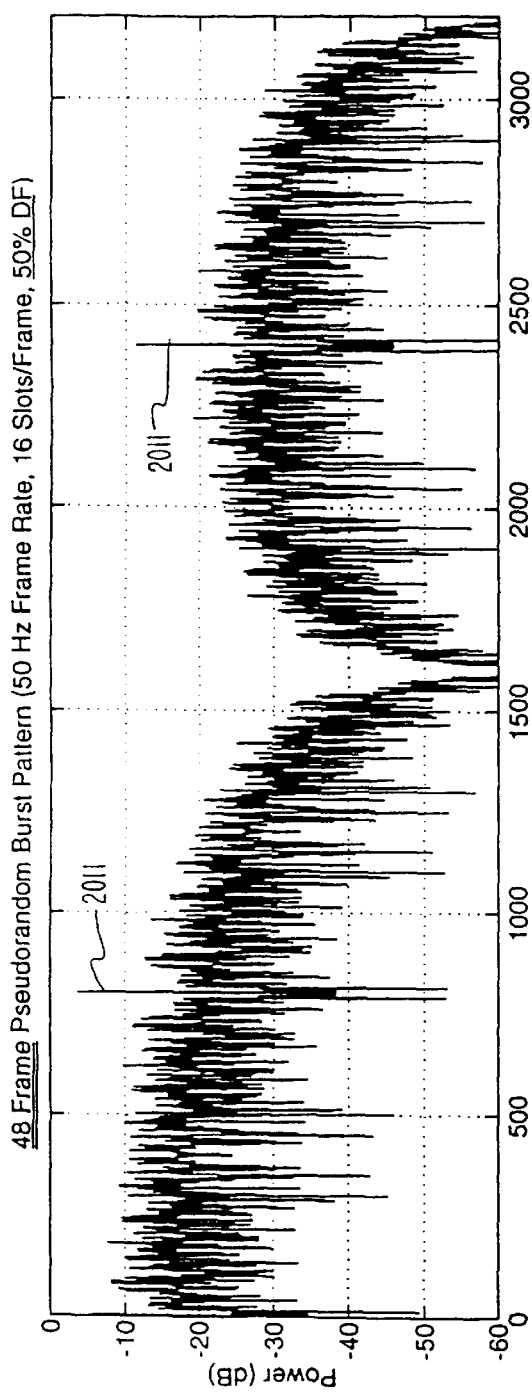
Figure 20B:
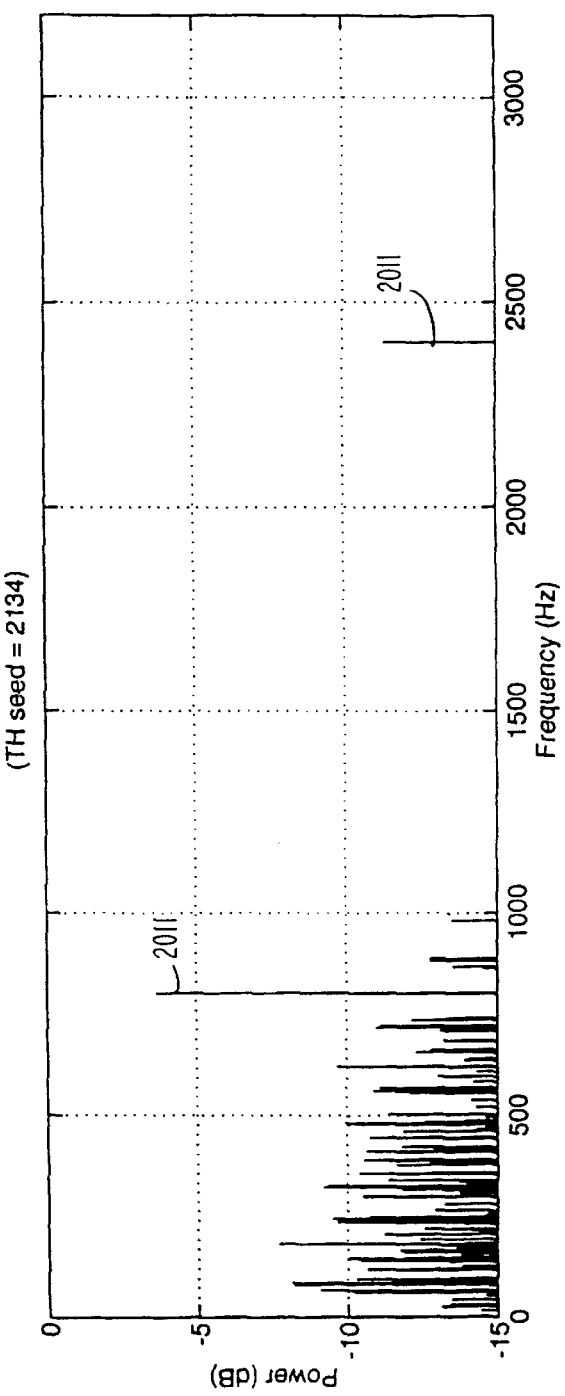
Figures 21A, 21B:
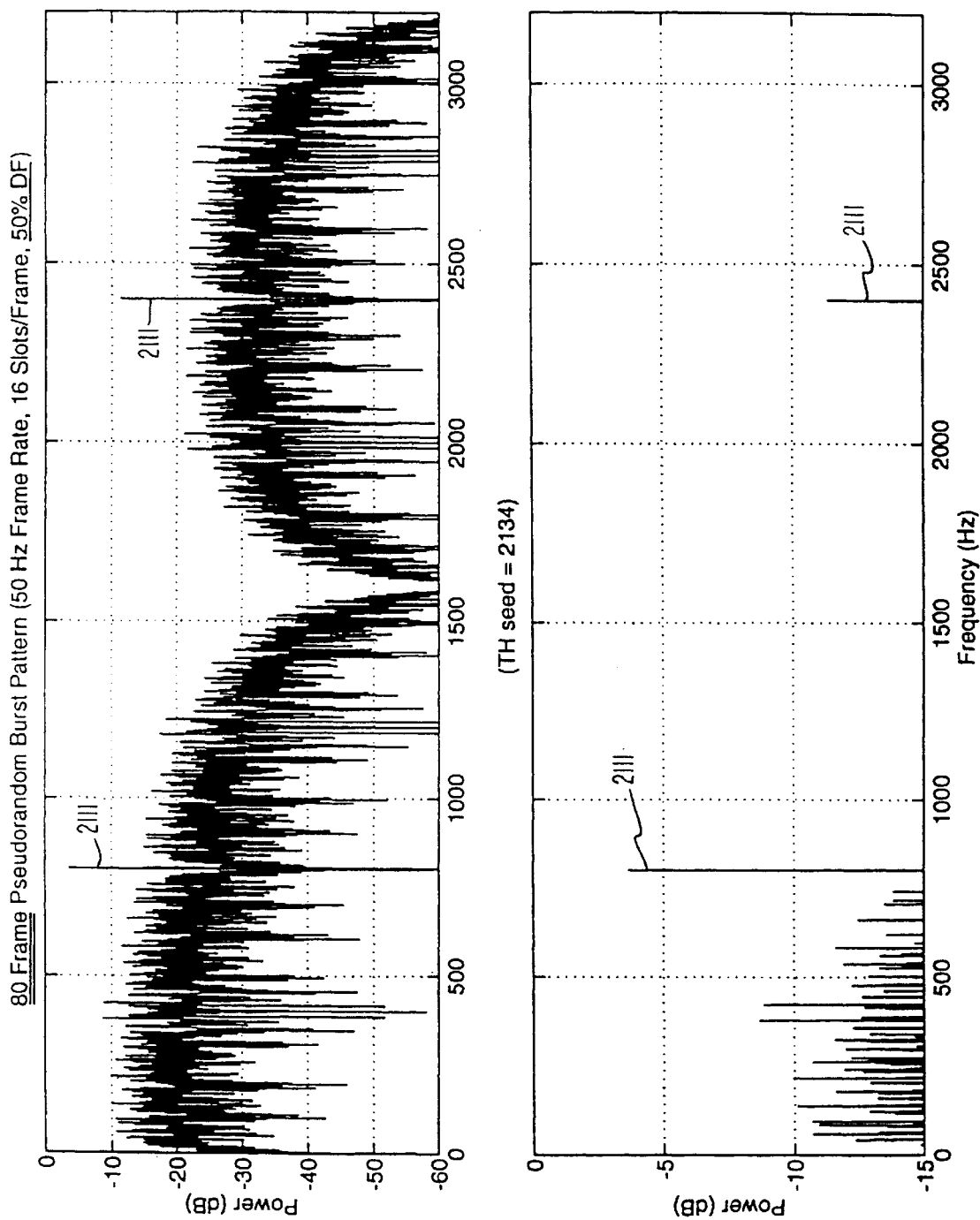

FIG. 19A is a frequency plot of the envelope spectrum of a transmitter using a 16-frame time hopping pattern (the same used for FIGS. 7A and 7B) in the FIG. 17A TDD system, and FIG. 19B is an enlargement of the upper portion of FIG. 19A. Likewise, FIGS. 20A and 20B are different scale frequency plots of the envelope spectrum of a transmitter using a 48-frame time hopping pattern in the FIG. 17A TDD system; FIGS. 21A and 21B are different scale frequency plots of the envelope spectrum of a transmitter using a 80-frame time hopping pattern in the FIG. 17A TDD system; and, FIGS. 22A and 22B are different scale frequency plots of the envelope spectrum of a transmitter using a 144-frame cyclic time hopping pattern in the FIG. 17A TDD system. As illustrated in FIGS. 19A through 22B, strong spectral lines 1911, 2011, 2111 and 2211 appear at odd integer multiples of 800 Hz, relatively independent of the timing hopping pattern length. These spectral lines 1911, 2011, 2111 and 2211 are generally a consequence of restricting transmissions to occur only in odd time slots, and generally occur at odd multiples of the frame rate multiplied by the number of time slots (i.e., 50 Hz ·16=800 Hz).

It may be possible to attenuate the strong spectral lines 1911, 2011, 2111 and 2211 in FIGS. 19A through 22B by periodically declaring a dead half-slot period, thereby causing user stations 102 to occasionally switch between "odd" and "even" slot positions. A drawback of this approach may be slightly reduced system capacity.

Figure 26:
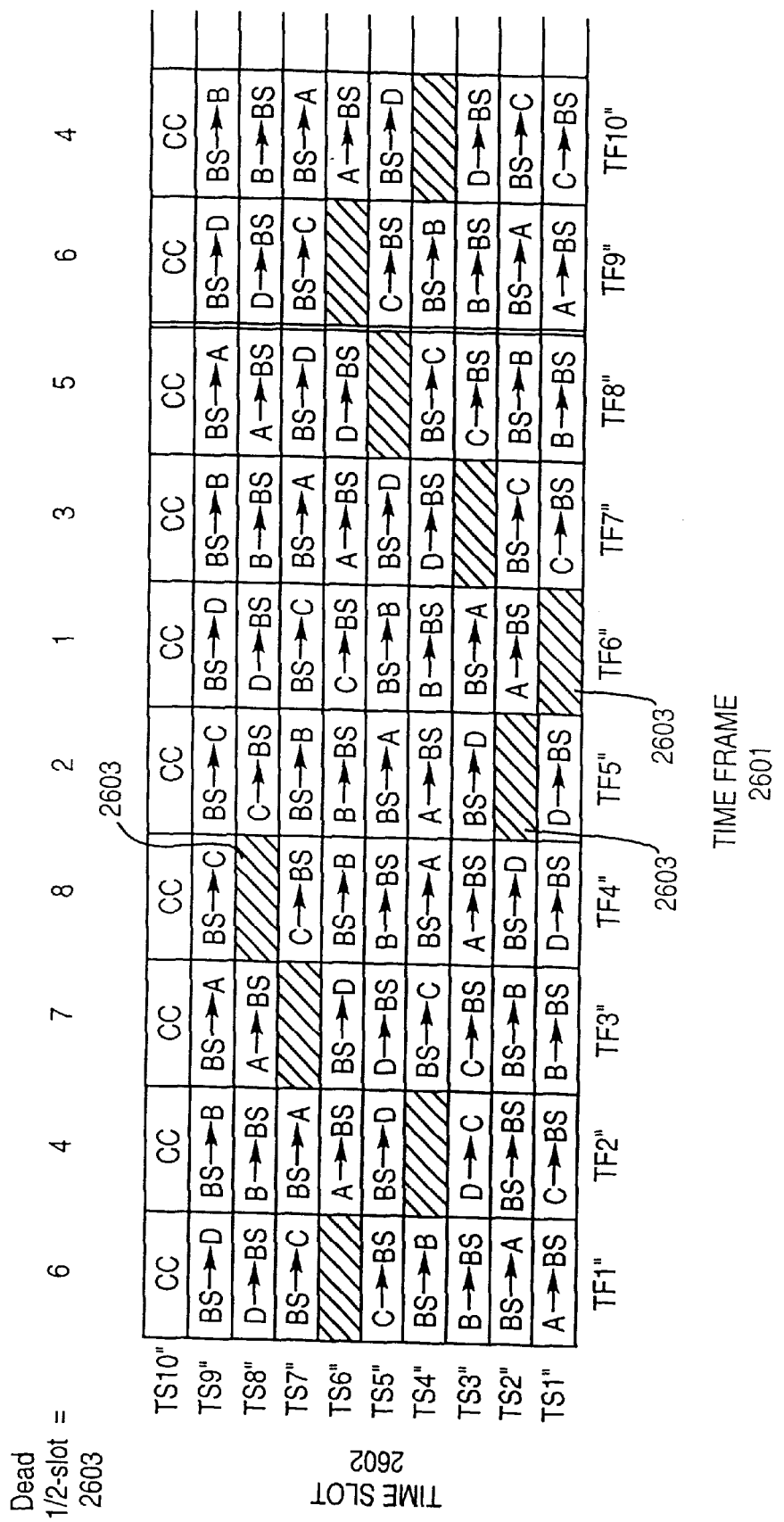
FIGS. 26 and 27 are timing diagrams of alternative cyclic time hopping systems having a "dead" time slot period.

FIG. 26 is a timing diagram of one embodiment of a cyclic time hopping communication system having a declared dead time slot period (i.e., half of a duplex time slot). FIG. 26 shows a plurality of time frames 2601 denoted consecutively as TF1", TF2", etc., each of which comprises a plurality of time slots 2602 denoted consecutively TS1", TS2", etc. Each time frame 2601 comprises a plurality of time slots 2602, each of which supports either a forward link or a reverse link transmission between the base station 104 and a user station 102.

The FIG. 26 system uses the same time hopping pattern as the FIG. 17B system described previously. However, a "dead" time slot 2603 is declared periodically, preferably once in each time frame 2601. Thus, in the first time frame TF1", the dead time slot 2603 is the sixth time slot TS6". In the second time frame TF2", the dead time slot 2603 is the fourth time slot TS4". The dead time slot 2603 is thus declared in a pseudorandom pattern, just like the pseudorandom time hopping pattern governing user station communications from time frame 2601 to time frame 2601. By altering the location of the dead time slot 2603 in such a fashion, the number of user stations 102 communicating in odd and even time slots 2602 also varies pseudorandomly. Although FIG. 26 shows an 8-frame repeating pattern for both user stations 102 and the dead time slot 2603, preferably different length repeating patterns are used to maximize the overall noiselike properties of the system.

In the FIG. 26 system, a control channel denoted "CC" may also optionally be employed. The control channel CC is a half duplex time slot which may, but need not, be located in a fixed position (e.g., time slot TS10"). In a system having a user-first transmission protocol, the control channel CC is conveniently located in the last time slot 2602 of each time frame 2601. The control channel CC may be used for broadcasting synchronization, usage, and/or identification information from the base station 104, and may also be used to assist in establishment of communication or handoff to another base station 104. Another control channel may be designated in the so-called "dead" time slot 2603, which varies in position from time frame 2601 to time frame 2601. In such a case, the "dead" time slot 2603 is not wasted. The "dead" time slot 2603 may also be used as a broadcast channel from the base station 104, or as a one-way communication channel, or as a half-speed communication channel between the base station 104 and a user station 102 not having full speed communication requirements (i.e, either a forward link or a reverse link message is transmitted each time frame 2601).

In the FIG. 26 embodiment, the ninth time slot TS9" and the tenth time slot TS10" need not ever be declared as a "dead" time slot 2603, because doing so (at least in a user-first transmission protocol) would not result in changing any user stations 102 from odd time slots to even time slots. Also, the ninth time slot TS9" can be included in the time hopping pattern for the user stations 102, in order to increase overall randomness. In such a case, the control channel CC will occasionally be displaced from the tenth time slot TS10".

The control channel CC can also be incorporated into the time hopping pattern, and therefore vary randomly along with the user slots. In this respect, the control channel CC can be used in either the FIG. 6 or the FIG. 26 systems; in other words, there is no limitation to the FIG. 26 embodiment which has a "dead" time slot 2603 position. In this embodiment, messages sent by the control channel include a header identifying it as such. By listening to the pattern for a sufficient period of time, a user station 102 will be able to identify the time hopping pattern and therefore the expected position of the control channel in subsequent time frames.

In another alternative embodiment, two dead time slots are declared in each time frame. One or both of the dead time slots can be used as control channels, as noted.

Figure 27:
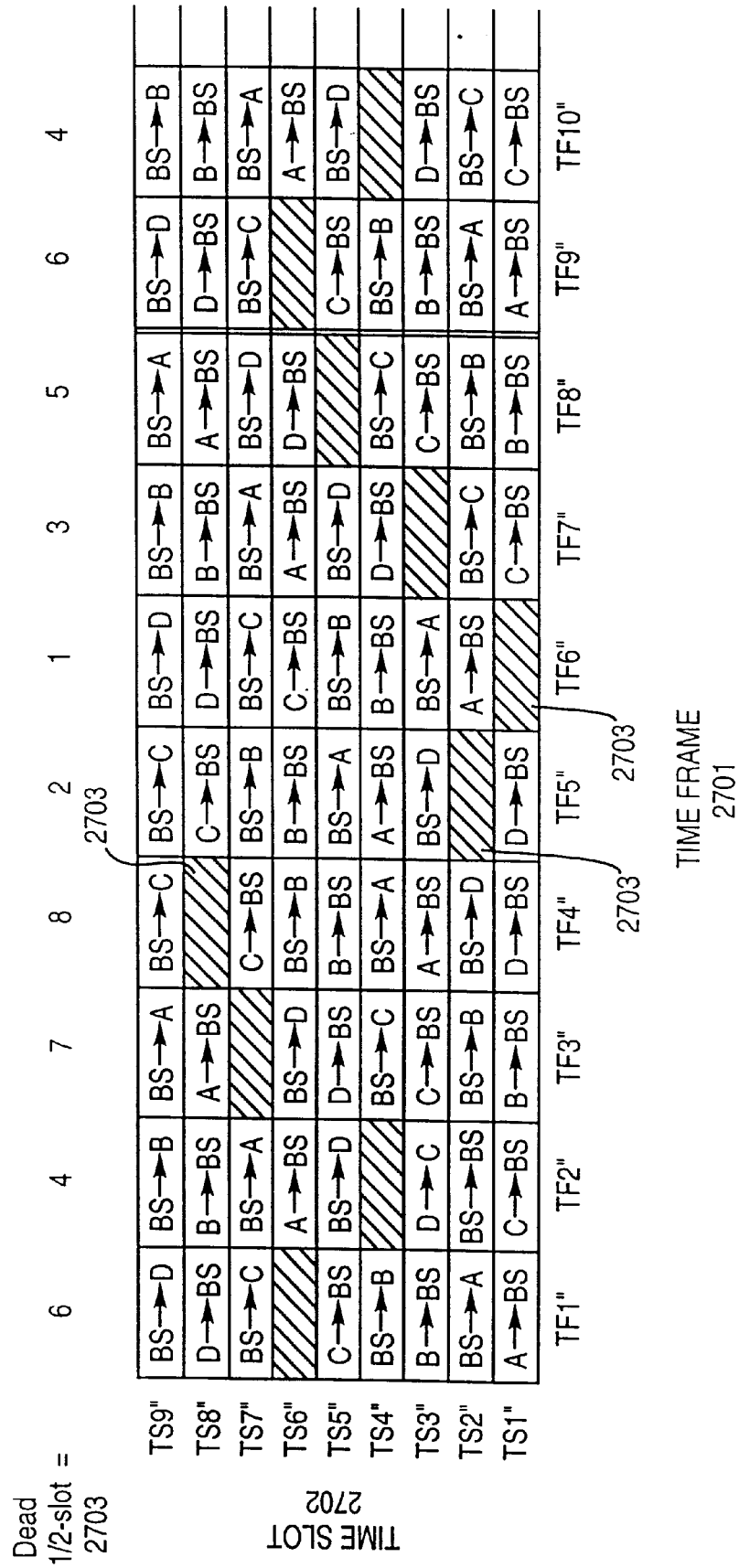

FIG. 27 is a timing diagram of an alternative cyclic time hopping system having a dead time slot period. FIG. 27 is generally similar to FIG. 26, with a plurality of time frames 2701 denoted TF1", TF2", etc., each divided into a plurality of time slots TS1", TS2", etc. The FIG. 27 system, however, has an odd number of time slots 2702—i.e., only nine time slots 2702. A dead time slot 2703 is declared periodically in a pseudorandom pattern, similar to the FIG. 26 system. No separate or fixed control channel is defined in the FIG. 27 system. As with the FIG. 26 system, the "dead" time slots 2703 may be used as a control channel, a broadcast channel, a one-way communication channel, or a half-speed duplex communication channel.

In a particular embodiment, all the base stations 104 of a communication system in a geographic region 101 employ the same time hopping pattern. The time hopping pattern is programmed in advance in each of the user stations 102. A user station 102 establishing communication with any of the base stations 104 in the system therefore knows in advance of the time hopping pattern, and each of the user stations 102 follows the same time hopping pattern. The time hopping pattern may applied to handshake signals for establishing communication which occur over multiple time frames, as well as to data traffic communications after a communication link is established.

If base stations 104 are not phase synchronized to one another in terms of time hopping patterns, then, as a consequence, the user stations 102 will also not be phase synchronized to one another. This means that the interference environment may change on a time-frame by time-frame basis. This may be true even where the base stations 104 use the same time hopping pattern, but are not synchronized to the same position within the time hopping pattern. Thus, if the same time hopping pattern is used at each base station 104, then all base stations 104 using the pattern preferably are synchronized to one another with respect to the time hopping pattern.

Interference problems may also occur where dead time slots are used, if the base stations 104 are not synchronized to one another. In particular, the lack of synchronization could lead to a situation where base stations 104 are transmitting at the same time as user stations 102 in their vicinity, a generally be an undesirable result. Thus, uniform base station synchronization is also preferred in a system using periodic dead time slots.

Communication between a user station 102 and a base station 104 may be established by any of a variety of means as known in the art. In an exemplary spread spectrum TDMA system, such as shown, e.g., in FIG. 17A, a user station 102 establishes communication with a base station 104 by responding to a general polling message in an available time slot 302. This process is described in more detail with reference to FIG. 14, which illustrates a protocol for establishment of a spread spectrum communication link in, e.g., the FIG. 17 communication system.

Figure 14:
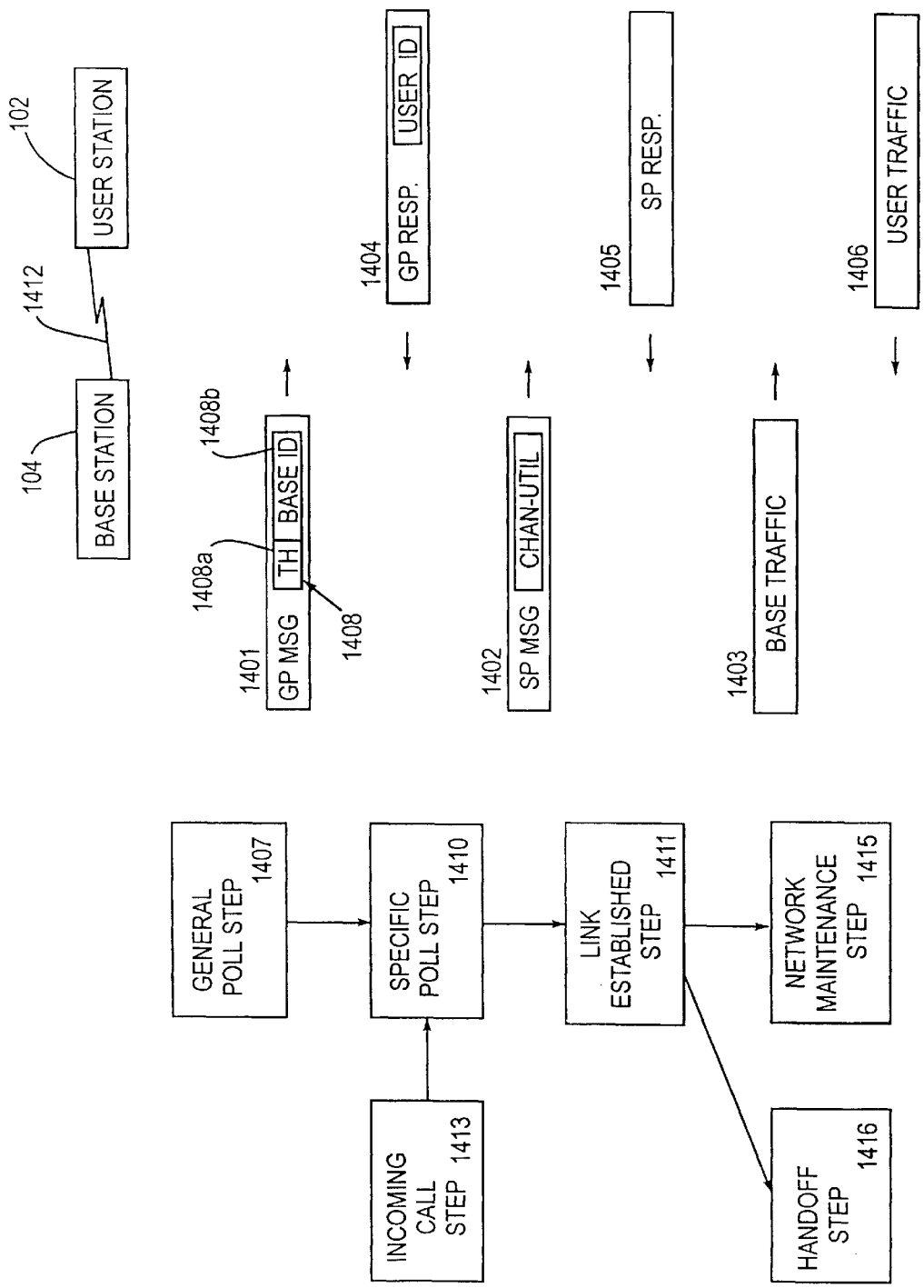
FIG. 14 is a diagram illustrating a protocol for establishment of a spread spectrum communication link in a particular communication system.

In the FIG. 14 embodiment, messages (base transmissions 1706 and user transmissions 1705) may be one of three types: a general poll message 1401, a specific poll message 1402, and an information message 1403. When a message is transmitted by a user station 102, it is called a "response", e.g., a general poll response 1404, a specific poll response 1405, and an information response 1406.

A user station 102 may "acquire" a base station 104 by a sequence of handshaking steps. At a general poll step 1407, the base station 104 may transmit its general poll message 1401 during an unoccupied time slot 1702. The user station 102 receives the general poll message 1401 and, if it was received without error, transmits its general poll response 1404 to the base station 104. The general poll message 1401 comprises a field for a base ID 1408b, which may be 32 bits long, which may be recorded by the user station 102. Similarly, the general poll response 1404 comprises a field for a user ID 1409, which may be 32 bits long, which may be recorded by the base station 104.

Upon receiving a general poll response 1404, at a specific poll step 1410, the base station 104 may transmit a specific poll message 1402, comprising the user ID 1409 received by the base station 104 as part of the general poll response 1404. The user station 102 receives the specific poll message 1402 and, if it was received without error and with the same user ID 1409, transmits its specific poll response 1405 to the base station 104. The specific poll response 1405 comprises the same user ID 1409 as the general poll response 1404.

In a preferred embodiment, however, the specific poll message 1402 may be eliminated as redundant. The user station 102 may therefore follow the general poll response 1404 with a specific poll response 1405.

Upon receiving a specific poll response 1405 comprising a user ID 1409 which matches that of the general poll response 1404, at a link-established step 1411, the base station 104 may transmit a traffic message 1403. At this point, the base station 104 and user station 102 have established a communication link 1412. The base station 104 may couple a telephone line to the communication channel, and the user station 102 may begin normal operation on a telephone network (e.g., the user station 102 may receive a dial tone, dial a number, make a telephone connection, and perform other telephone operations). The base station 104 and user station 102 may exchange traffic messages 1403 and 1406, until the communication link 1412 is voluntarily terminated, until faulty communication prompts the user station 102 to re-acquire the base station 104, or until handoff of the user station 102 to another base station 104.

Should more than one user station 102 respond to the same general poll message 1401, the base station 104 may advertently fail to respond. The lack of response from the base station 104 signals the involved user stations 102 to back off for a calculated time interval before attempting to acquire the same base station 104 using the general poll message 1401 and general poll response 1404 protocol. The back-off time may be based upon the user ID 1409, and therefore each user station 102 will back off for a different length of time to prevent future collisions.

When an incoming telephone call is received at a base station 104, at an incoming-call step 1413, the base station 104 transmits a specific poll message 1402 with the user ID 1409 of the indicated recipient user station 102 (skipping the general poll message 1401 and the general poll response 1404) on an available time slot 1702. Each user station 102 listens regularly for the specific poll message 1402 so as to receive the specific poll message 1402 within a predetermined time after it is transmitted. When the specific poll message 1402 is received, the user station 102 compares the user ID 1409 in the message with its own user ID, and if they match, continues with the link-established step 1411. The base station 104 may thus establish a communication link 1412 with any user station 102 within communication range.

Further details regarding means for establishing communication (particularly spread spectrum communication) in a TDMA system may be found in U.S. Pat. No. 5,455,822 issued Oct. 3, 1995, and in U.S. patent application Ser. No. 08/284,053 filed Aug. 1, 1994 both of which are hereby incorporated by reference as if fully set forth herein.

In a cyclic time hopping system, when a user station 102 first establishes communication, it needs to know where in the time hopping pattern the base station 104 presently is. One possibility is to define a single time slot 1702 as a control channel for slot acquisition. In such a case, information as to the relative position in the time hopping pattern may be transmitted to the user station 102 upon establishing a link, along with a time slot assignment. Where no control channel is used, however, a different approach may be necessary.

In one embodiment, wherein the handshake structure depicted in FIG. 14 is used, time hopping pattern position information is provided as part of the general polling message 1401. In particular, each general polling message 1401 includes a time hopping pattern position field 1408a containing bits which indicate the relative position in the time hopping pattern. For example, where a 16-frame time hopping pattern is used, the general polling message 1401 would include a time hopping pattern position field 1408a of four bits, each combination of bits representing one of the sixteen possible relative pattern positions. Likewise, a 48-frame pattern would use a time hopping pattern position field 1408a of 6 bits, an 80-frame pattern would use a field 1408a of 7 bits, and a 144-frame pattern would use a field 1408a of 8 bits.

Figure 25:
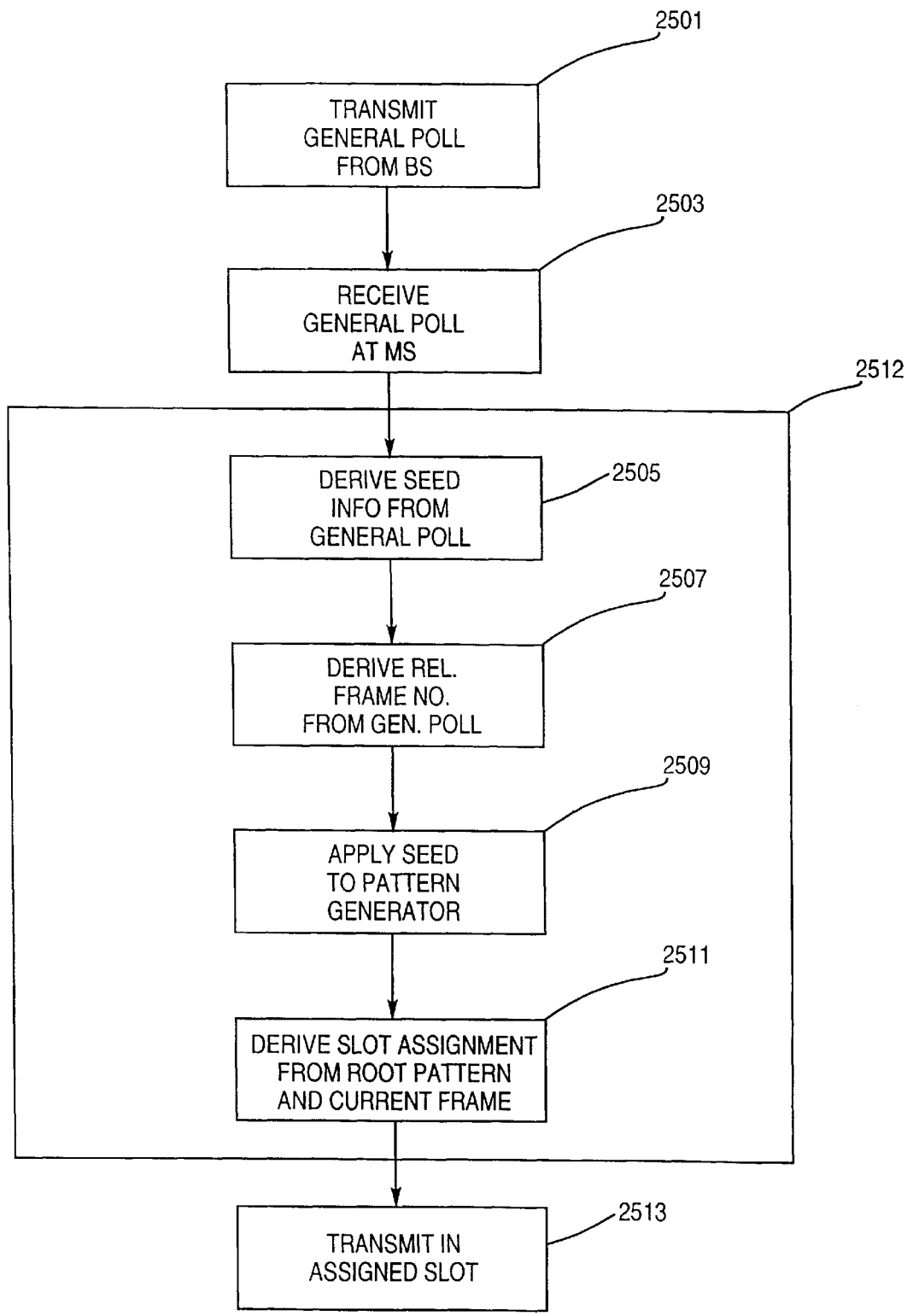
FIG. 25 is a diagram illustrating steps for determining an initial time slot assignment upon establishment of communication.

FIG. 25 is a diagram illustrating the steps of this protocol in more detail. In a first step 2501, a general poll message 1401 is sent from the base station 104, indicating availability of a particular time slot 1702. The general poll message is received at a user station 102 desiring to establish communication in step 2503. In step 2505, the user station 102 derives information about the time hopping pattern from the general poll message 1401. For example, the general poll message 1401 may contain information including a seed which, when applied to a pseudo-random number generator in the user station 102, results in the time hopping pattern for the particular base station 104. Thus, different base stations 104 may employ different time hopping patterns.

In a next step 2507, the user station 102 derives the relative time frame 1701 position from information in the general poll message 1401. For example, the user station may determine the relative time frame position from reading the time hopping pattern position field 1408a. In a next step 2509, the user station 102 applies the seed to a pseudo-random number generator to obtain the root pattern. In a next step 2511, the user station 102 determines the appropriate time slot 1702 in which to transmit in the following time frame 1701. This determination is made by considering the relative position of the time slot 1702 in which the general poll message 1401 was sent, the root pattern, and the relative frame number as appearing in the time hopping pattern position field 1408a. To assist this determination, the general poll message 1401 may also include a slot identification field indicating which relative time slot 1702 the general poll message 1401 is sent on. Collectively, steps 2505, 2507, 2509, and 2511 comprise the transmission slot derivation step 2512. In one embodiment, step 2512 is implemented by logic circuitry.

The user station 102 then responds in step 2513 in the appropriate time slot 1702 as determined, with a responsive message such as a general polling response message 1404.

In a particular embodiment, after a general poll response message 1404 is received at the base station 104, the base station 104 assigns a time slot 1702 to a user station 102 by transmitting a message with the specific user ID 1409 in the selected time slot 1702 in the following time frame 1701. The user station 102 determines the time slot 1702 assigned to it by monitoring all the time slots 1702 for its specific user ID 1409.

In alternative embodiments, the time hopping pattern information is provided as part of the specific poll message, or over a control channel.

Other approaches to initial determination of the time hopping pattern and position may also be used. For example, GSM systems commonly have a provision for transferring information to a user station regarding which of several frequency hopping patterns should be used. The base station transfers a series of parameters (e.g., two parameters) to the user station, which applies the parameters to a frequency hopping pattern generator to generate one of a plurality of possible frequency hopping patterns. A similar provision can be used in a time hopping system to transfer information regarding which of several time hopping patterns should be used, and/or what the relative pattern position is at the time of establishing communication.

The present invention has been set forth in the form of its preferred embodiments. It is nevertheless intended that modifications to the disclosed communication techniques may be made by those skilled in the art without departing from the scope and spirit of the present invention. Moreover, such modifications are considered to be within the purview of the appended claims.

For example, other methods other than use of a pseudo-random number generator may be used to arrive at a suitable root pattern. In particular, performance may be improved by employing a root hopping pattern having higher energy in the null regions of the $\sin(x)/x$ spectrum, in a similar manner to selection of timing patterns in the field of digital magnetic recording in order to overcome nulls in magnetic head response.

Another modification involves the use of forward error correction by interleaving messages over multiple transmission bursts. Forward error correction by interleaving messages is generally explained in, e.g., U.S. patent application Ser. No. 08/465,555 filed Jun. 5, 1995 is incorporated by reference as if fully set forth herein.

In one embodiment using forward error correction, a data stream is provided to a rate one-half convolutional encoder, which outputs a plurality of data symbols for transmission. The data symbols are then divided in an interleaved fashion over a plurality of transmission bursts. At the receiver, the plurality of transmission bursts are received, and the inverse operations performed to obtain the original data stream. For example, 160 bits in the data stream, after application of the convolutional encoder, may result in 320 data symbols for transmission. The 320 data symbols are divided into a plurality of bursts (e.g., four bursts), each of which comprises 80 data symbols. The data symbols are assigned among the bursts in an interleaved pattern; thus, burst-1 comprises symbols 1, 5, 9, etc.; burst-2 comprises symbols 2, 6, 10, etc.; and so on.

The separate bursts are transmitted over a plurality of time frames. Thus, four bursts (in the above example) would be transmitted over four consecutive time frames. By use of the described interleaving and redundancy in the transmission bursts, an interfering source is less likely to corrupt the transmitted data. At the received, the four bursts are received, and the inverse operations are performed, as noted, to recover the original 160 bits of information. As an alternative to using forward error correction, diagonal error correction (which is a known technique) may also be used.

The use of forward (or diagonal) error correction in conjunction with time hopping may provide very effective interference rejection. The use of time hopping provides additional interference diversity by pseudo-randomly assigning a communication channel to different time slot locations over several time frames. The continuously changing time slot location for the communication channel makes it less likely that an interfering source will corrupt an entire communication.

In another alternative embodiment of the invention, rather than using a time hopping pattern generator, various time hopping root patterns are stored in a memory in the user station 102. Upon establishment of communication with a base station 104, or prior thereto (e.g., by monitoring a base station broadcast channel), the user station 102 is instructed as to which of the various stored time hopping root patterns to use for communication with the particular base station 104.

Further, while preferred embodiments have been described wherein the relative time slot assignments for the user stations change each time frame, it is also possible to change the time slot assignments on a less frequent basis (e.g., every two time frames, or other selected period of time frames).

Other modifications and variations will be apparent to those skilled in the art, and it is understood that the scope of the invention is not to be limited by the specific embodiments disclosed herein, but only by the appended claims.

What is claimed is:

1. A method for communicating comprising the steps of:
   generating a plurality of continuous time frames, dividing each of said time frames into a plurality of time slots;
   generating, using a root pattern based algorithm, a random pattern; and
   transmitting, from a user station to a base station, in a selected time slot of said plurality of time slots in said each time frame according to said random pattern;
   wherein said random pattern is generated by a modulo-n operation on said root pattern and an initial time slot assignment whereby another user station cannot occupy said selected time slot simultaneously in any given time frame within a cellular region.

2. The method of claim 1 wherein said time slots comprises both user slots and base slots, and said random pattern is restricted to said user slots.

3. A method for communicating comprising the steps of:
   defining a plurality of continuous time frames, dividing each of said time frames into a plurality of time slots,
   generating, using an algorithm, a random pattern,
   transmitting, from a user station to a base station, in a selected time slot of said plurality of time slots in each time frame according to said random pattern, and
   periodically declaring a dead time slot during which said user station does not transmit,
   wherein said time slots comprise both user slots and base slots.

4. The method of claim 3 wherein said dead time slot is declared according to a second random pattern.

5. The method of claim 1 wherein said random pattern repeats after a fixed number of time frames, and wherein said user station determines said fixed number.

6. The method of claim 3 wherein said random pattern is further determined based on an initial time slot assignment.

7. A method for communicating between a base station and a plurality of user stations comprising the steps of:
   generating a plurality of time frames;
   dividing each of said time frames into an equal number of time slots, during each of which said base station may communicate with one of said plurality of user stations;
   generating a random root pattern whereby a relative time slot position varies over a predefined number of time frames; and
   varying, for each user station, a respective time slot position according to said root pattern and an initial time slot assignment;
   wherein said varying step occurs according to a modulo-n operation on said root pattern and said initial time slot assignment.

8. The method of claim 7 wherein said root pattern repeats after a fixed number of time frames.

9. The method of claim 7 further comprising transmitting, from said base station to another user station seeking to establish communication with said base station, information whereby said another user station is enabled to generate said random root pattern.

10. A multiple access communication system comprising
    a plurality of time frames, and
    a plurality of time slots in each of said time frames, each of which time slots may be assigned to one of a plurality of user stations for communication with a base station,
    wherein each user station in communication with said base station periodically changes a relative position of its assigned time slot according to an algorithmically determined random pattern such that no two user stations occupy the same time slot simultaneously in any given time frame, and
    wherein said random pattern is specifically selected to minimize energy in the nulls of the $\sin(x)/(x)$ spectrum resulting from a transmission burst length corresponding to said user time slot.

11. A multiple access communication system employing interleaved format and forward error correction comprising a plurality of time frames, and a plurality of time slots in each of said time frames, each of which time slots may be assigned to one of a plurality of user stations for communication with a base station, wherein each user station in communication with said base station periodically changes a relative position of its assigned time slot according to an algorithmically determined random pattern such that no two user stations occupy the same time slot simultaneously in any given time frame, whereby periodically changing said relative position of said assigned time slot in conjunction with said interleaved format and said forward error correction enhances interference diversity.

12. A multiple access communication system comprising:

a plurality of time frames of equal duration, a plurality of user time slots in each of said time frames, wherein one of a plurality of user stations may transmit a forward link message to a base station, and a plurality of base time slots, equal in number to said user time slots, wherein said base station may transmit a reverse link message to one of said user stations, wherein each user station in communication with said base station periodically changes a relative position of its user time slot according to a first algorithmically determined random pattern such that no two user stations occupy the same user time slot simultaneously in any given time frame.

13. The multiple access communication system of claim 12 wherein said base station transmits said reverse link message to said one user station in a base time slot selected independently of said relative time slot communicated in by said one user station.

14. The multiple access communication system of claim 12 wherein said random pattern repeats after a fixed number of time frames.

15. The multiple access communication system of claim 12 wherein one of said user time slots is periodically declared as a dead slot during which no user station transmits whereby harmonics resulting from division of said time frames into both user and base station time slots are suppressed.

16. The multiple access communication system of claim 15 wherein said dead slot changes relative positions each time frame according to a second random pattern.

17. The multiple access communication system of claim 15 wherein said system is used for communication within a cellular region and wherein a root pattern is generated common to other user stations within said cellular region, and wherein said first random pattern is selected by a modulo-n operation on said root pattern and an initial time slot assignment whereby no two user stations occupy the same time slot simultaneously in any given time frame within said cellular region in any give time frame.

* * * * *